(12) United States Patent
Kondo et al.

(10) Patent No.: US 7,796,784 B2
(45) Date of Patent: Sep. 14, 2010

(54) PERSONAL AUTHENTICATION METHOD FOR CERTIFICATING INDIVIDUAL IRIS

(75) Inventors: Kenji Kondo, Kyoto (JP); Takeo Azuma, Nara (JP); Masahiro Wakamori, Kanagawa (JP)

(73) Assignee: Panasonic Corporation, Osaka (JP)

( * ) Notice: Subject to any disclaimer, the term of this patent is extended or adjusted under 35 U.S.C. 154(b) by 965 days.

(21) Appl. No.: 10/506,311

(22) PCT Filed: Oct. 28, 2003

(86) PCT No.: PCT/JP03/13805

§ 371 (c)(1),
(2), (4) Date: Sep. 1, 2004

(87) PCT Pub. No.: WO2004/042658

PCT Pub. Date: May 21, 2004

(65) Prior Publication Data

US 2005/0152583 A1    Jul. 14, 2005

(30) Foreign Application Priority Data

Nov. 7, 2002    (JP) .............................. 2002-324229

(51) Int. Cl.
G06K 9/00 (2006.01)
G06K 9/54 (2006.01)
G06F 7/00 (2006.01)

(52) U.S. Cl. ....................... 382/117; 382/115; 382/305; 707/790

(58) Field of Classification Search .................. 382/117
See application file for complete search history.

(56) References Cited

U.S. PATENT DOCUMENTS

| | | | | | |
|---|---|---|---|---|---|
| 4,641,349 | A | * | 2/1987 | Flom et al. | 382/117 |
| 5,291,560 | A | * | 3/1994 | Daugman | 382/117 |
| 5,546,529 | A | * | 8/1996 | Bowers et al. | 715/848 |
| 5,901,238 | A | * | 5/1999 | Matsushita | 382/117 |
| 6,028,949 | A | * | 2/2000 | McKendall | 382/117 |
| 6,055,322 | A | * | 4/2000 | Salganicoff et al. | 382/117 |
| 6,247,813 | B1 | * | 6/2001 | Kim et al. | 351/206 |
| 6,333,988 | B1 | * | 12/2001 | Seal et al. | 382/117 |
| 6,424,746 | B1 | * | 7/2002 | Nishida | 382/195 |
| 6,526,160 | B1 | * | 2/2003 | Ito | 382/117 |
| 6,532,298 | B1 | * | 3/2003 | Cambier et al. | 382/117 |
| 6,542,624 | B1 | * | 4/2003 | Oda | 382/117 |
| 6,546,121 | B1 | * | 4/2003 | Oda | 382/117 |

(Continued)

FOREIGN PATENT DOCUMENTS

EP    1237117 A2    9/2002

(Continued)

*Primary Examiner*—Wenpeng Chen
*Assistant Examiner*—Gandhi Thirugnanam
(74) *Attorney, Agent, or Firm*—Harness, Dickey & Pierce, P.L.C.

(57) ABSTRACT

A plurality of iris codes are registered for each registrant in an iris database (12) together with pupil diameter-iris diameter ratio R. At the time of authentication, an iris code is obtained from a captured iris image by feature extraction while pupil diameter-iris diameter ratio R is obtained. Ratio R obtained at the time of registration and ratio R obtained at the time of authentication are compared to specify an appropriate iris code from the iris database (12) as an item to be collated before authentication.

7 Claims, 26 Drawing Sheets

U.S. PATENT DOCUMENTS

| | | | |
|---|---|---|---|
| 6,591,001 B1* | 7/2003 | Oda et al. | 382/117 |
| 6,614,919 B1* | 9/2003 | Suzaki et al. | 382/117 |
| 7,277,561 B2* | 10/2007 | Shin | 382/117 |
| 7,444,017 B2* | 10/2008 | Gallagher | 382/167 |
| 7,599,524 B2* | 10/2009 | Camus et al. | 382/117 |
| 7,623,686 B2* | 11/2009 | Kondo et al. | 382/117 |
| 2001/0026632 A1* | 10/2001 | Tamai | 382/116 |
| 2002/0016839 A1* | 2/2002 | Smith et al. | 709/224 |
| 2002/0024633 A1* | 2/2002 | Kim et al. | 351/206 |
| 2002/0039433 A1* | 4/2002 | Shin | 382/117 |
| 2003/0002714 A1* | 1/2003 | Wakiyama | 382/117 |
| 2003/0012413 A1* | 1/2003 | Kusakari et al. | 382/117 |
| 2003/0118217 A1* | 6/2003 | Kondo et al. | 382/117 |
| 2003/0123711 A1* | 7/2003 | Kim et al. | 382/117 |
| 2003/0156741 A1* | 8/2003 | Lee et al. | 382/117 |
| 2003/0206645 A1* | 11/2003 | Okazaki et al. | 382/117 |
| 2004/0037452 A1* | 2/2004 | Shin | 382/117 |
| 2004/0190759 A1* | 9/2004 | Caldwell | 382/117 |
| 2004/0197011 A1* | 10/2004 | Camus et al. | 382/103 |
| 2005/0008200 A1* | 1/2005 | Azuma et al. | 382/117 |
| 2005/0249385 A1* | 11/2005 | Kondo et al. | 382/117 |
| 2006/0008124 A1* | 1/2006 | Ewe et al. | 382/117 |
| 2006/0098867 A1* | 5/2006 | Gallagher | 382/167 |
| 2009/0141946 A1* | 6/2009 | Kondo et al. | 382/117 |
| 2009/0161923 A1* | 6/2009 | Kondo et al. | 382/117 |
| 2009/0169064 A1* | 7/2009 | Kim et al. | 382/117 |
| 2009/0207251 A1* | 8/2009 | Kobayashi et al. | 348/156 |
| 2009/0220126 A1* | 9/2009 | Claret-Tournier et al. | 382/117 |
| 2009/0232418 A1* | 9/2009 | Lolacono et al. | 382/312 |
| 2009/0252382 A1* | 10/2009 | Liu et al. | 382/117 |

FOREIGN PATENT DOCUMENTS

| | | |
|---|---|---|
| JP | 5-84166 | 12/1993 |
| JP | 06-203145 | 7/1994 |
| JP | 10-262953 | 10/1998 |
| JP | 11-213164 | 8/1999 |
| JP | 2967012 | 8/1999 |
| JP | 2000-033080 | 2/2000 |
| JP | 2000-105830 | 4/2000 |
| JP | 2000-194855 A | 7/2000 |
| JP | 2001-167279 A | 6/2001 |
| JP | 2001-195594 | 7/2001 |
| JP | 2002-117394 A | 4/2002 |
| JP | 2002-236665 A | 8/2002 |
| WO | WO 86/05018 | 8/1986 |
| WO | WO 94/09446 A1 | 4/1994 |

* cited by examiner

Registration process

FIG. 8
(a)
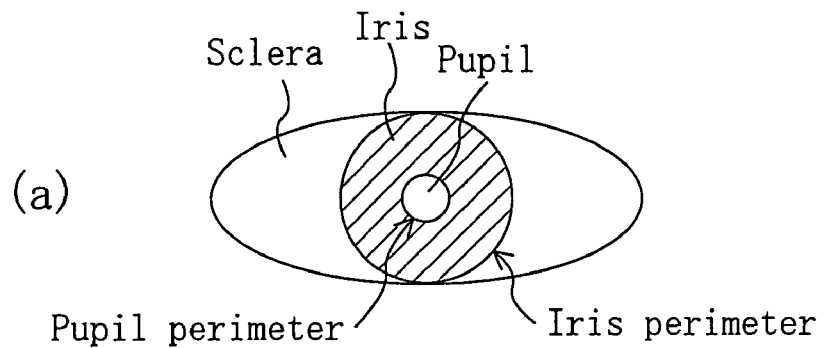
(b)
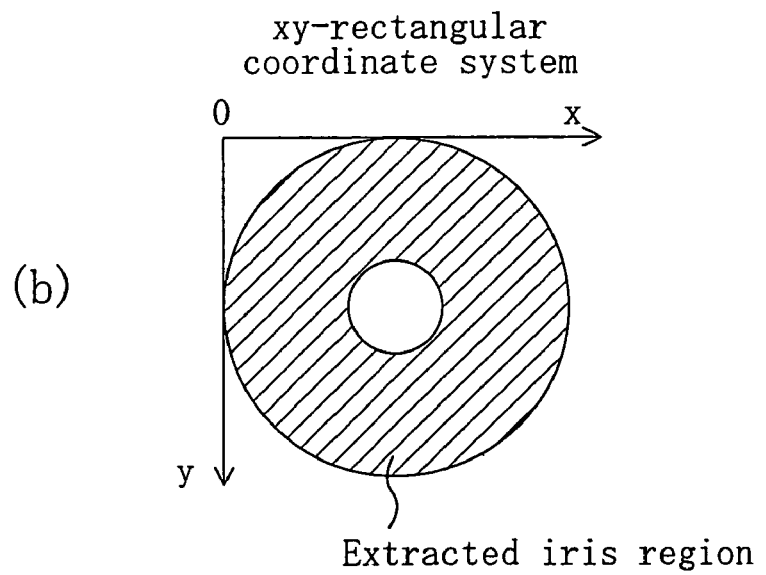
(c)
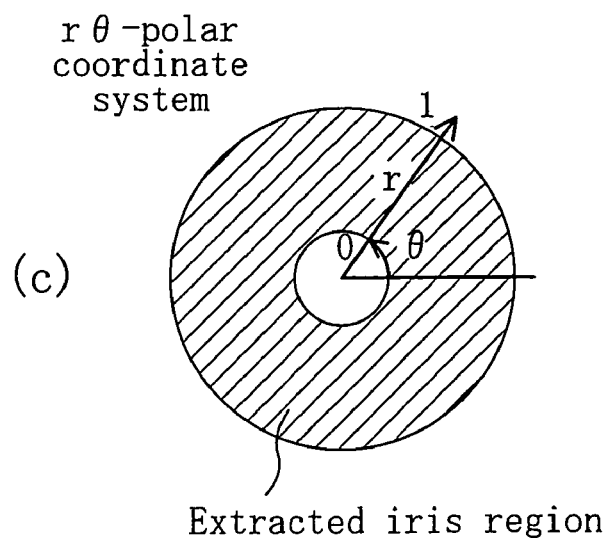

| Code No. | 0 | 1 | 2 | 3 | 4 | 5 | 6 | 7 | 8 | 9 |
|---|---|---|---|---|---|---|---|---|---|---|
| 0 | | 0.15 | 0.20 | 0.24 | 0.31 | 0.34 | 0.38 | 0.41 | 0.42 | 0.41 |
| 1 | | | 0.16 | 0.22 | 0.24 | 0.32 | 0.37 | 0.38 | 0.40 | 0.42 |
| 2 | | | | 0.14 | 0.21 | 0.26 | 0.30 | 0.34 | 0.37 | 0.39 |
| 3 | | | | | 0.13 | 0.18 | 0.24 | 0.29 | 0.37 | 0.40 |
| 4 | | | | | | 0.16 | 0.22 | 0.28 | 0.31 | 0.36 |
| 5 | | | | | | | 0.13 | 0.19 | 0.24 | 0.28 |
| 6 | | | | | | | | 0.14 | 0.21 | 0.24 |
| 7 | | | | | | | | | 0.15 | 0.19 |
| 8 | | | | | | | | | | 0.12 |
| 9 | | | | | | | | | | |

FIG. 13

| Iris code No. | Registrant No. | Pupil diameter-iris diameter ratio |
|---|---|---|
| 00000 | 00000 | 0.21 |
| 00001 | 00000 | 0.39 |
| 00002 | 00000 | 0.58 |
| 00003 | 00001 | 0.19 |
| 00004 | 00001 | 0.42 |
| 00005 | 00001 | 0.61 |
| ... | ... | ... |
| N-1 | M-1 | 0.62 |

Registration process

| Feature data No. | Registrant No. | Parameters |
|---|---|---|
| 00000 | 00000 | $a_{0,0} \sim a_{0,Z-1}, b_{0,0} \sim b_{0,Z-1}, c_{0,0} \sim c_{0,Z-1}, d_{0,0} \sim d_{0,Z-1}$ |
| 00001 | 00001 | $a_{1,0} \sim a_{1,Z-1}, b_{1,0} \sim b_{1,Z-1}, c_{1,0} \sim c_{1,Z-1}, d_{1,0} \sim d_{1,Z-1}$ |
| 00002 | 00002 | $a_{2,0} \sim a_{2,Z-1}, b_{2,0} \sim b_{2,Z-1}, c_{2,0} \sim c_{2,Z-1}, d_{2,0} \sim d_{2,Z-1}$ |
| ... | ... | ... |
| N-1 | N-1 | $a_{N-1,0} \sim a_{N-1,Z-1}, b_{N-1,0} \sim b_{N-1,Z-1}, c_{N-1,0} \sim c_{N-1,Z-1}, d_{N-1,0} \sim d_{N-1,Z-1}$ |

Authentication process

FIG. 27

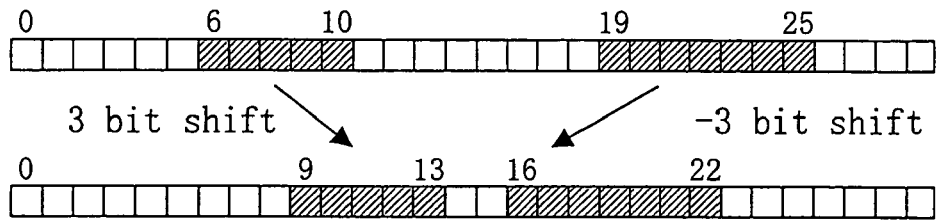

Iris code of pupil diameter-iris diameter ratio R0

Iris code of pupil diameter-iris diameter ratio R1

FIG. 28

| Registration code ID | Pupil diameter-iris diameter ratio in authentication process | Transformation rule |
|---|---|---|
| 0 | R0 | · Shift Ath to Bth bits by C bits<br><br>· Shift Dth to Eth bits by F bits<br><br>· · · |
| | R1 | · Shift Gth to Hth bits by I bits<br><br>· · · |
| | · · · | · · · |
| · · · | · · · | · · · |
| i | · · · | · · · |
| | · · · | · · · |

PERSONAL AUTHENTICATION METHOD FOR CERTIFICATING INDIVIDUAL IRIS

TECHNICAL FIELD

The present invention relates to a personal authentication technique that uses iris recognition and specifically to a technique for improving the accuracy of iris authentication under various circumstances, for example, under external light, such as sunlight, or the like, in the nighttime, etc.

BACKGROUND ART

In recent years, a personal authentication technique utilizing iris recognition has been started to be used for entrance/exit management in a restricted building, bank ATMs (Automated Teller Machines), PC login applications, etc.

Japanese Patent Publication for Opposition No. 5-84166 (hereinafter, referred to as Document 1) discloses a basic iris recognition method wherein iris image information obtained at the time of authentication is compared with stored iris image information to identify a person. In this method, the pupil diameter is changed by illuminating an eye, and the pupil diameter is set to a predetermined diameter by controlling the illumination intensity. Thereafter, iris images or feature amounts extracted from the iris images are compared with each other. The diameter of the pupil changes according to the environmental brightness, the state of feeling, or the like. If the pupil diameters are different, mutual comparison of iris images or feature amounts is difficult. Thus, in Document 1, the pupil diameter is adjusted by illumination before comparison. However, a certain time is required for changing the pupil diameter to a predetermined diameter, and accordingly, authentication takes time.

The above problem is solved in Japanese Unexamined PCT National Phase Publication No. 8-504979 (Document 2) and Japanese Unexamined Patent Publication No. 2000-194855 (Document 3) as described below.

Document 2 proposes a feature extraction method which does not depends on the pupil diameter, wherein an iris region is expressed in a polar coordinate system. Specifically, the iris region is expressed in a polar coordinate system where the center of the pupil/iris border approximated to a circle is the origin point of the system, and the radial coordinate is expressed by the proportion of the distance between the pupil/iris border and the iris/sclera border. With such a method, even when the pupil diameter measured at the time of registration is different from that measured at the time of authentication, features in a certain expression are extracted, and the amounts of the extracted features are compared with each other. Thus, it is not necessary to control the pupil diameter at the time of authentication, and accordingly, the authentication time is shortened as compared with the method of Document 1.

In Document 3, at the time of registration, a plurality of iris images having different pupil diameters are captured by using different illumination intensities, the feature amounts extracted from the plurality of iris images are registered, and a feature amount extracted from an iris image captured at the time of authentication is compared with the plurality of registered feature amounts. Even if the pupil diameter of an iris image captured at the time of authentication has an arbitrary value, the pupil diameter can be compared with registered data which has a substantially-equal pupil diameter because a plurality of iris images having different pupil diameters have been captured at the time of registration. Thus, it is not necessary to control the pupil diameter at the time of authentication, and accordingly, the authentication time is shortened as compared with the method of Document 1.

Problems to be Solved by the Invention

Document 2 describes that "[t]he iris expands and contracts in response to light in order to adjust the dimensions of the pupil. However, fine tissue of the iris does not almost change except for expansion and contraction". Because of a polar coordinate expression, the iris pattern scarcely changes even when the iris diameter is changed, and accordingly, authentication is performed with a suppressed false rejection rate. However, strictly explaining, the iris pattern slightly changes, and this change causes a slight increase in the hamming distance at the time of authentication. Even if the increase in the hamming distance is in a generally-acceptable range, a false rejection sometimes occurs in the case where the increase in the hamming distance is combined with other hamming distance increasing factors, such as concealment of an iris region by the eyelid or eyelash, etc.

In Document 3, feature data extracted from a plurality of iris images are registered, and accordingly, it is necessary to provide a large-capacity registration database. Further, at the time of authentication, it is necessary to perform comparison with a plurality of pieces of feature data, and accordingly, the process time for authentication increases.

In view of the above, an objective of the present invention is to achieve personal authentication using iris authentication, which is robust to the variation in the pupil diameter and in which the increase of a database and the increase of the process time at authentication are suppressed.

DISCLOSURE OF INVENTION

Specifically, the present invention provides a personal authentication method using iris images, comprising a registration process and an authentication process, the registration process including the steps of: acquiring an iris image from a registrant; obtaining feature data and a pupil opening degree index from the acquired iris image; and performing data registration for the registrant in an iris database using the obtained feature data and pupil opening degree index, and the authentication process including the steps of: acquiring an iris image from a person to be authenticated; obtaining feature data and a pupil opening degree index from the acquired iris image; obtaining feature data to be collated by referring to data registered for a registrant in the iris database with the pupil opening degree index obtained in the authentication process; and comparing the feature data to be collated with the feature data obtained in the authentication process to determine whether or not the person to be authenticated is identical to the registrant.

According to the above invention, at the time of registration, data registration is carried out in the iris database using feature data and a pupil opening degree index which are obtained from an iris image. At the time of authentication, the data registered in the iris database is referred to, and a pupil opening degree index obtained from an iris image at the time of authentication is used to obtain feature data to be collated. Since feature data determined according to the degree of opening of the pupil is obtained as an item to be collated irrespective of whether the pupil is in a contracted state or an expanded state at the time of authentication, sufficiently-accurate personal authentication with reduced false rejection rate can be carried out under various conditions.

In the personal authentication method of the present invention, it is preferable that the registration process includes the step of registering the feature data together with the pupil opening degree index in the iris database in conjunction with the registrant, and the authentication process includes the step of specifying the feature data to be collated from feature data registered in the iris database in conjunction with a registrant by comparing the pupil opening degree index obtained in the authentication process with the pupil opening degree index registered together with the feature data.

With the above structure, at the time of registration, feature data obtained from an iris image is registered together with a pupil opening degree index in the iris database. At the time of authentication, among the feature data registered in the iris database, pupil opening degree indices are compared with the pupil opening degree index obtained in the authentication process to specify feature data to be collated. Thus, feature data determined according to the degree of opening of the pupil is specified as an item to be collated irrespective of the state of the pupil at the time of authentication. Since feature data to be collated can readily be retrieved by using a pupil opening degree index, authentication can be carried out within a short time period.

In the personal authentication method of the present invention, it is preferable that the registration process includes the steps of: acquiring a plurality of iris images having different pupil opening degrees from the registrant; obtaining a relational expression between feature data and a pupil opening degree index based on a plurality of pieces of feature data and pupil opening degree indices which are extracted from the plurality of acquired iris images; and registering parameters for expressing the relational expression in the iris database in conjunction with the registrant, and the authentication process includes the step of obtaining a relational expression from parameters registered in the iris database in conjunction with a registrant and assigning the pupil opening degree index obtained in the authentication process to the relational expression to obtain the feature data to be collated.

With the above structure, at the time of registration, parameters for expressing a relational expression between a plurality of pieces of feature data obtained from a plurality of iris images having different pupil opening degrees and a pupil opening degree index are registered in the iris database. At the time of authentication, a pupil opening degree index obtained from an iris image at the time of authentication is assigned to a relational expression expressed by the parameters registered in the iris database, whereby feature data to be collated is obtained. Thus, feature data determined according to the degree of opening of the pupil is obtained as an item to be collated irrespective of the state of the pupil at the time of authentication. Since feature data to be collated can readily be obtained by only assigning a pupil opening degree index to a relational expression, authentication can be carried out within a short time period.

In the personal authentication method of the present invention, it is preferable that the registration process includes the steps of: acquiring a plurality of iris images having different pupil opening degrees from the registrant; specifying registration feature data from a plurality of pieces of feature data obtained from the plurality of acquired iris images and obtaining a transformation rule for transforming the registration feature data to another feature data having a different pupil opening degree index; and registering the registration feature data and the transformation rule in the iris database in conjunction with the registrant, the authentication process includes the step of generating feature data to be collated using a pupil opening degree index obtained in the authentication process based on feature data and a transformation rule which are registered in the iris database in conjunction with a registrant.

With the above structure, at the time of registration, registration feature data and a transformation rule for transformation to another feature data having a different pupil opening degree index are obtained from a plurality of pieces of feature data obtained from a plurality of iris images having different pupil opening degrees and registered in the iris database. At the time of authentication, feature data to be collated is generated using a pupil opening degree index obtained from an iris image at the time of authentication based on the feature data and transformation rule registered in the iris database. Thus, feature data determined according to the degree of opening of the pupil is obtained as an item to be collated irrespective of the state of the pupil at the time of authentication.

Further, the present invention provides a personal authentication method using iris images, comprising: the first step of acquiring an iris image from a person to be authenticated; the second step of obtaining feature data and a pupil opening degree index from the iris image obtained at the first step; the third step of obtaining feature data to be collated by referring to data registered for a registrant in an iris database in which data registration has been done using pupil opening degree indices with the pupil opening degree index obtained at the second step; and the fourth step of comparing the feature data to be collated which is obtained at the third step with the feature data obtained at the second step to determine whether or not the person to be authenticated is identical to the registrant.

The present invention provides a device which performs data registration for iris authentication, comprising: means for acquiring an iris image from a registrant; means for obtaining feature data and a pupil opening degree index from the iris image; and means for performing data registration for the registrant in an iris database using the feature data and the pupil opening degree index.

The present invention provides a device which performs personal authentication using iris images, comprising: means for acquiring an iris image from a person to be authenticated; means for obtaining feature data and a pupil opening degree index from the iris image; means for obtaining feature data to be collated by referring to data registered for a registrant in an iris database in which data registration has been done using pupil opening degree indices with the obtained pupil opening degree index; and means for comparing the feature data to be collated with the feature data to determine whether or not the person to be authenticated is identical to the registrant.

The present invention provides a program for instructing a computer to execute personal authentication using iris images, comprising the steps of: obtaining feature data and a pupil opening degree index from an iris image acquired from a person to be authenticated; obtaining feature data to be collated by referring to data registered for a registrant in an iris database in which data registration has been done using pupil opening degree indices with the obtained pupil opening degree index; and comparing the feature data to be collated with the feature data to determine whether or not the person to be authenticated is identical to the registrant.

As described above, according to the present invention, feature data determined according to the degree of opening of the pupil is obtained as an item to be collated irrespective of whether the pupil is in a contracted state or an expanded state at the time of authentication. Thus, sufficiently-accurate personal authentication can be carried out under various conditions. Furthermore, since feature data to be collated can readily be retrieved or acquired by using a pupil opening degree index, authentication can be carried out within a short time period.

BRIEF DESCRIPTION OF DRAWINGS

FIG. 8(a) shows an iris region. FIG. 8(b) shows an iris region in a xy-coordinate system. FIG. 8(c) shows an iris region in a polar-coordinate system.

FIG. 13 shows an example of a data content in an iris database according to embodiment 1 of the present invention.

FIG. 27 conceptually illustrates an example of a method for calculating a transformation rule according to embodiment 3 of the present invention.

FIG. 28 illustrates an example of a transformation rule stored in an iris database.

BEST MODE FOR CARRYING OUT THE INVENTION

Figure 1:
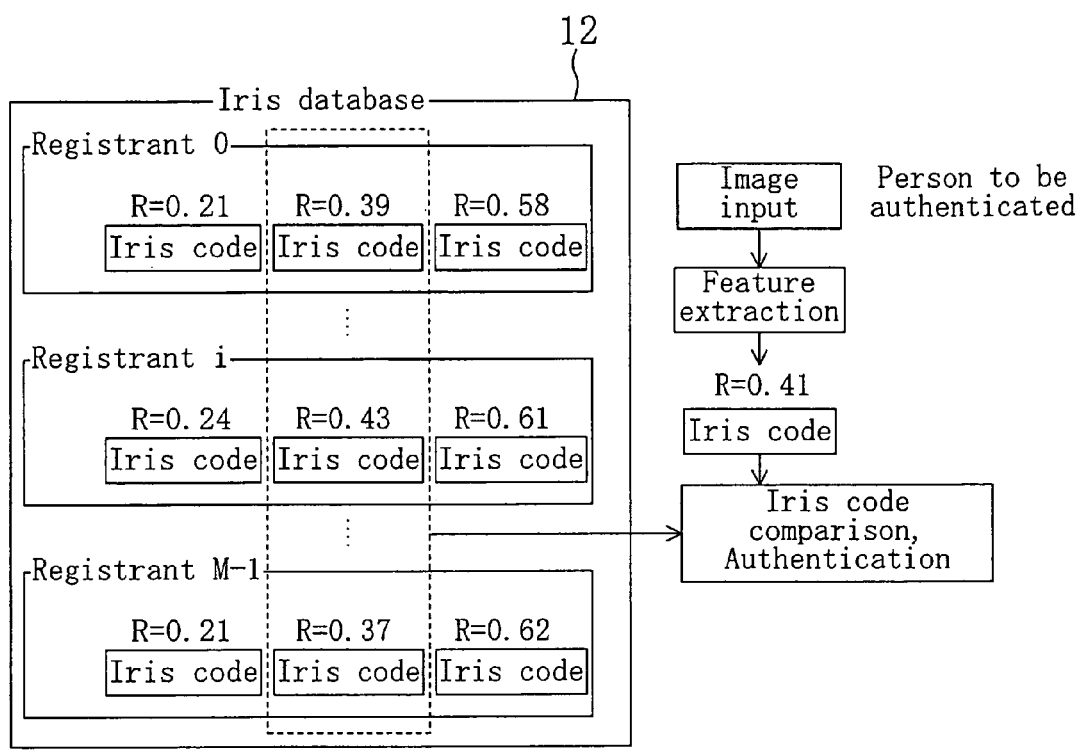
FIG. 1 conceptually illustrates a personal authentication method according to embodiment 1 of the present invention.

According to the first aspect of the present invention, there is provided a personal authentication method using iris images, comprising a registration process and an authentication process, the registration process including the steps of: acquiring an iris image from a registrant; obtaining feature data and a pupil opening degree index from the acquired iris image; and performing data registration for the registrant in an iris database using the obtained feature data and pupil opening degree index, and the authentication process including the steps of: acquiring an iris image from a person to be authenticated; obtaining feature data and a pupil opening degree index from the acquired iris image; obtaining feature data to be collated by referring to data registered for a registrant in the iris database with the pupil opening degree index obtained in the authentication process; and comparing the feature data to be collated with the feature data obtained in the authentication process to determine whether or not the person to be authenticated is identical to the registrant.

According to the second aspect of the present invention, there is provided the personal authentication method of the first aspect, wherein: the registration process includes the step of registering the feature data together with the pupil opening degree index in the iris database in conjunction with the registrant; and the authentication process includes the step of specifying the feature data to be collated from feature data registered in the iris database in conjunction with the registrant by comparing the pupil opening degree index obtained in the authentication process with the pupil opening degree index registered together with the feature data.

According to the third aspect of the present invention, there is provided the personal authentication method of the second aspect, wherein the registration process includes the step of at least registering three pieces of feature data of the registrant obtained from iris images in a pupil-contracted state, in a normal state, and in a pupil-dilated state, respectively.

According to the fourth aspect of the present invention, there is provided the personal authentication method of the second aspect, wherein the registration process includes the steps of: acquiring a plurality of iris images having different pupil opening degrees from the registrant; obtaining feature data from each of the plurality of acquired iris images; and collating the plurality of pieces of feature data with each other to select feature data to be registered in the iris database from the plurality of pieces of feature data.

According to the fifth aspect of the present invention, there is provided the personal authentication method of the second aspect, wherein the authentication process is aborted when feature data having a pupil opening degree index which is close to the pupil opening degree index obtained in the authentication process by a predetermined difference is not registered for the registrant.

According to the sixth aspect of the present invention, there is provided the personal authentication method of the fifth aspect, wherein when the authentication process is aborted, a preferable condition for capturing an iris image is estimated based on the pupil opening degree index obtained in the authentication process and a pupil opening degree index associated with registered feature data, and the person to be authenticated is advised to re-acquire an iris image under the estimated capturing condition.

According to the seventh aspect of the present invention, there is provided the personal authentication method of the first aspect, wherein the registration process includes the steps of: acquiring a plurality of iris images having different pupil opening degrees from the registrant; obtaining a relational expression between feature data and a pupil opening degree index based on a plurality of pieces of feature data and pupil opening degree indices obtained from the plurality of acquired iris images; and registering parameters for expressing the relational expression in the iris database in conjunction with the registrant, and the authentication process includes the step of obtaining a relational expression from parameters registered in the iris database in conjunction with a registrant and assigning the pupil opening degree index obtained in the authentication process to the relational expression to obtain the feature data to be collated.

According to the eighth aspect of the present invention, there is provided the personal authentication method of the seventh aspect, wherein: the registration process includes the step of thinning the parameters before registration; and the authentication process includes the step of restoring the thinned parameters by interpolation.

According to the ninth aspect of the present invention, there is provided the personal authentication method of the first aspect, wherein the registration process includes the steps of: acquiring a plurality of iris images having different pupil opening degrees from the registrant; specifying registration feature data from a plurality of pieces of feature data obtained from the plurality of acquired iris images and obtaining a transformation rule for transforming the registration feature data to another feature data having a different pupil opening degree index; and registering the registration feature data and the transformation rule in the iris database in conjunction with the registrant, the authentication process includes the step of generating the feature data to be collated using the pupil opening degree index obtained in the authentication process based on feature data and a transformation rule registered in the iris database in conjunction with a registrant.

According to the tenth aspect of the present invention, there is provided the personal authentication method of the first aspect, wherein the pupil opening degree index is the ratio of a pupil diameter to an iris diameter in an iris image.

According to the eleventh aspect of the present invention, there is provided a personal authentication method using iris images, comprising: the first step of acquiring an iris image from a person to be authenticated; the second step of obtaining feature data and a pupil opening degree index from the iris image obtained at the first step; the third step of obtaining feature data to be collated by referring to data registered for a registrant in an iris database in which data registration has been done using pupil opening degree indices with the pupil opening degree index obtained at the second step; and the fourth step of comparing the feature data to be collated which is obtained at the third step with the feature data obtained at the second step to determine whether or not the person to be authenticated is identical to the registrant.

According to the twelfth aspect of the present invention, there is provided the personal authentication method of the eleventh aspect, wherein: the iris database stores at least one piece of feature data for each registrant together with a pupil opening degree index; and at the third step, a pupil opening degree index registered together with the feature data, which is selected from the at least one piece of feature data registered in the iris database in conjunction with the registrant, is compared with the pupil opening degree index obtained at the second step to specify the feature data to be collated.

According to the thirteenth aspect of the present invention, there is provided the personal authentication method of the eleventh aspect, wherein: the iris database stores parameters which express a relational expression between feature data and a pupil opening degree index for each registrant; and at the third step, a relational expression is obtained from the parameter registered in the iris database in conjunction with a registrant, and the pupil opening degree index obtained at the second step is assigned to the relational expression, whereby the feature data to be collated is obtained.

According to the fourteenth aspect of the present invention, there is provided the personal authentication method of the eleventh aspect, wherein: the iris database stores feature data and a transformation rule for transforming the feature data to another feature data having a different pupil opening degree index for each registrant; and at the third step, the feature data to be collated is generated using the pupil opening degree index obtained at the second step based on the feature data and the transformation rule registered in the iris database in conjunction with a registrant.

According to the fifteenth aspect of the present invention, there is provided an iris registration device which performs data registration for iris authentication, comprising: means for acquiring an iris image from a registrant; means for obtaining feature data and a pupil opening degree index from the iris image; and means for performing data registration for the registrant in an iris database using the feature data and the pupil opening degree index.

According to the sixteenth aspect of the present invention, there is provided an iris authentication device which performs personal authentication using iris images, comprising: means for acquiring an iris image from a person to be authenticated; means for obtaining feature data and a pupil opening degree index from the iris image; means for obtaining feature data to be collated by referring to data registered for a registrant in an iris database in which data registration has been done using pupil opening degree indices with the obtained pupil opening degree index; and means for comparing the feature data to be collated with the feature data to determine whether or not the person to be authenticated is identical to the registrant.

According to the seventeenth aspect of the present invention, there is provided a program for instructing a computer to execute personal authentication using iris images, comprising the steps of: obtaining feature data and a pupil opening degree index from an iris image acquired from a person to be authenticated; obtaining feature data to be collated by referring to data registered for a registrant in an iris database in which data registration has been done using pupil opening degree indices with the obtained pupil opening degree index; and comparing the feature data to be collated with the feature data to determine whether or not the person to be authenticated is identical to the registrant.

Hereinafter, embodiments of the present invention are described with reference to the drawings.

Embodiment 1

FIG. 1 conceptually illustrates a personal authentication method according to embodiment 1 of the present invention. As shown in FIG. 1, according to embodiment 1, a plurality of iris codes are registered for each registrant in an iris database 12 together with the ratio (R) between the pupil diameter and the iris diameter (hereinafter, referred to as "pupil diameter-iris diameter ratio"). At the time of authentication, an iris code is obtained from a captured iris image by feature extraction, while pupil diameter-iris diameter ratio R is obtained. Then, ratio R of the registered data and ratio R obtained for authentication are compared to select an appropriate iris code as an item to be collated, and authentication is performed with the selected iris code.

Figure 2:
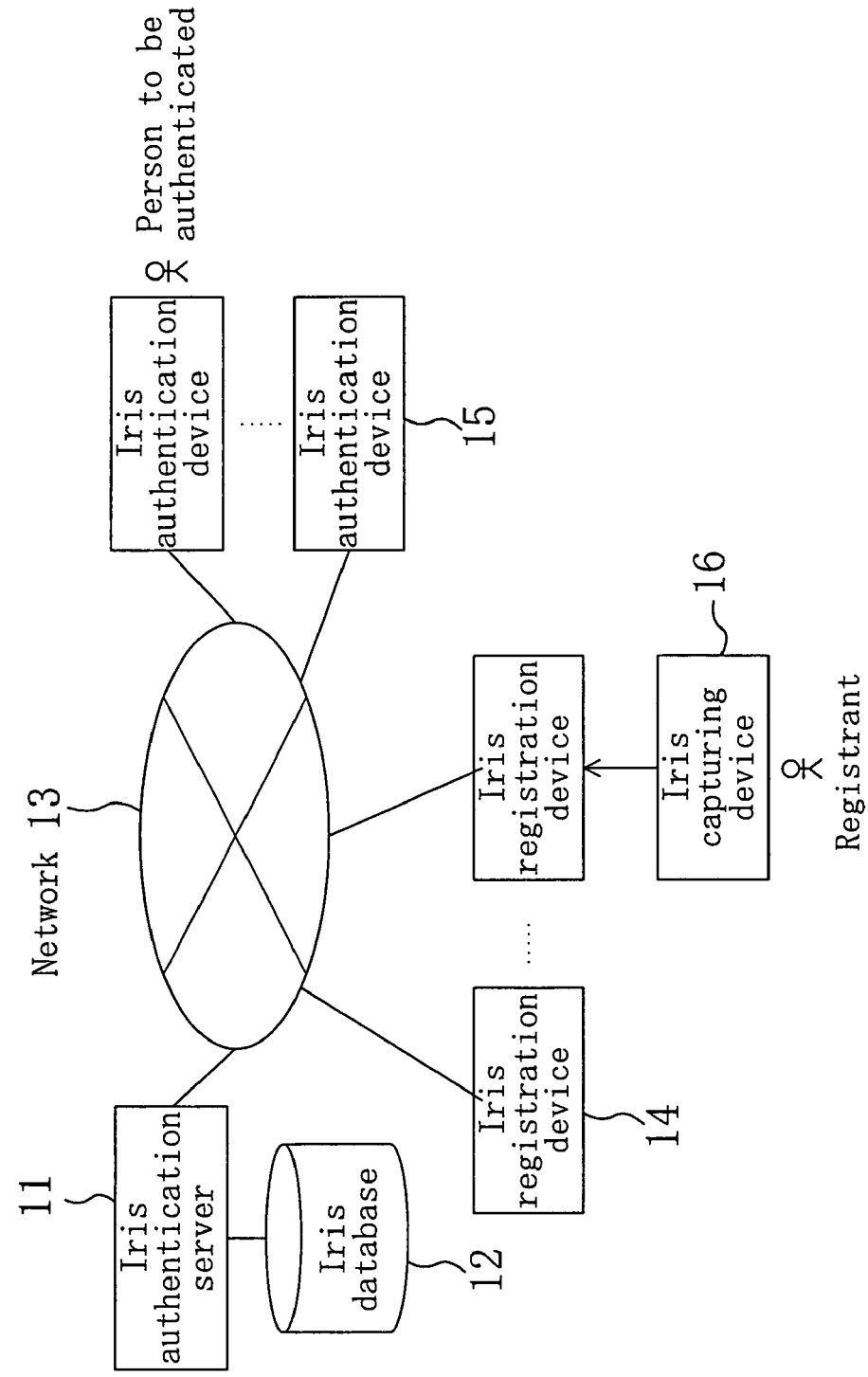
FIG. 2 shows an entire structure of an iris authentication system according to an embodiment of the present invention.

FIG. 2 shows the entire structure of an authentication system according to embodiment 1. In FIG. 2, an iris authentication server 11 includes an iris database 12 for storing feature data extracted from iris images of a plurality of registrants. The iris authentication server 11 is connected to a network 13, such as the Internet, a private line, a public line, etc. An iris registration device 14 and an iris authentication device 15 are also connected to the network 13. The iris registration device 14 transmits an iris code generated at the time of registration to the iris database 12. The iris authentication device 15 compares an iris code generated at the time of authentication with the iris code generated at the time of registration, which is obtained from the iris database 12, to perform personal authentication.

It should be noted that each region or each organization which utilizes the iris personal authentication system may have one iris authentication server 11 or may have a plurality of iris authentication servers 11 including mirror servers for load distribution. The iris database 12 may be connected to the iris authentication server 11 through a network.

Figure 3:
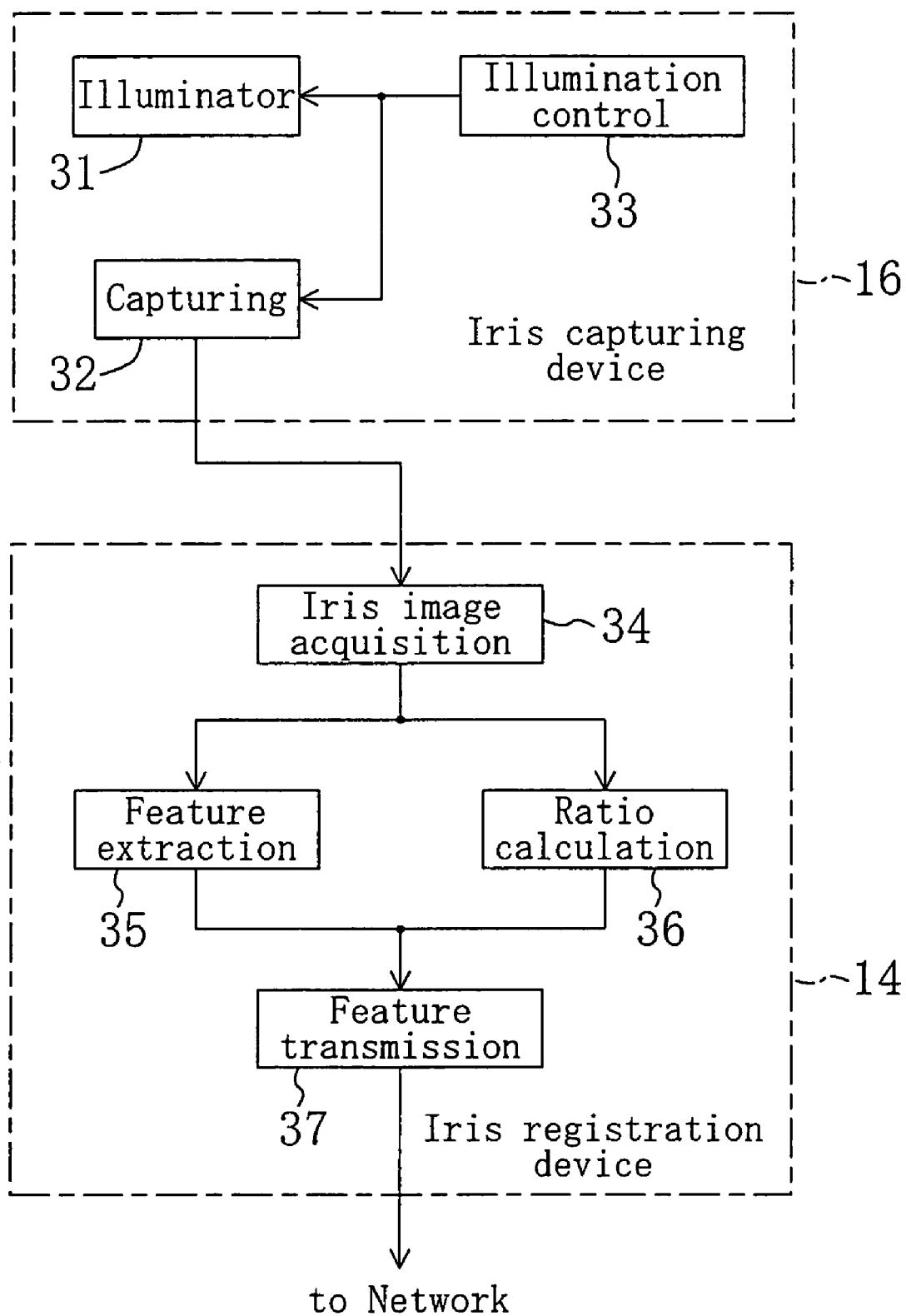
FIG. 3 is a block diagram showing a structure of an iris registration device and an iris capturing device according to embodiment 1 of the present invention.

FIG. 3 is a block diagram showing a structure of an iris registration device and an iris capturing device in the authentication system of FIG. 2. As shown in FIG. 3, an iris capturing device 16 includes an illuminator 31 for illuminating a facial area of a person to be registered with visible light, a capturing section 32 capable of continually capturing a plurality of images of the person to be registered, and an illumination controlling section 33 for controlling the emission intensity of the illuminator 31.

The iris registration device 14 includes an iris image acquisition section 34, a feature extraction section 35 for extracting feature data (iris code) from an acquired iris image, a ratio calculation section 36 for calculating the pupil diameter-iris diameter ratio in the acquired iris image as an index of the degree of opening of the pupil (pupil opening degree), and a feature transmission section 37 for transmitting the feature data and the pupil diameter-iris diameter ratio in conjunction with each other to the network 13. Herein, the iris image acquisition section 34 acquires a plurality of iris images having different pupil opening degrees which are transmitted from the iris capturing device 16. The feature data transmitted from the feature transmission section 37 to the network 13 is registered in the iris database 12.

In the case where the iris registration device 14 is structured integrally with the iris authentication server, it is only necessary to provide, in place of the feature transmission section 37, a feature storage section for registering the feature data and the pupil diameter-iris diameter ratio in conjunction with each other in the iris database. The iris registration device 14 and the iris capturing device 16 may be integrally structured or may be structured separately. Further, it is also possible that the iris registration device 14 only captures iris images and transmits the captured images to the iris authentication server 11, while generation of iris codes is performed at the iris authentication server 11. Furthermore, all of the functions of the iris registration device 14 may be incorporated in the iris authentication server 11.

Figure 4:
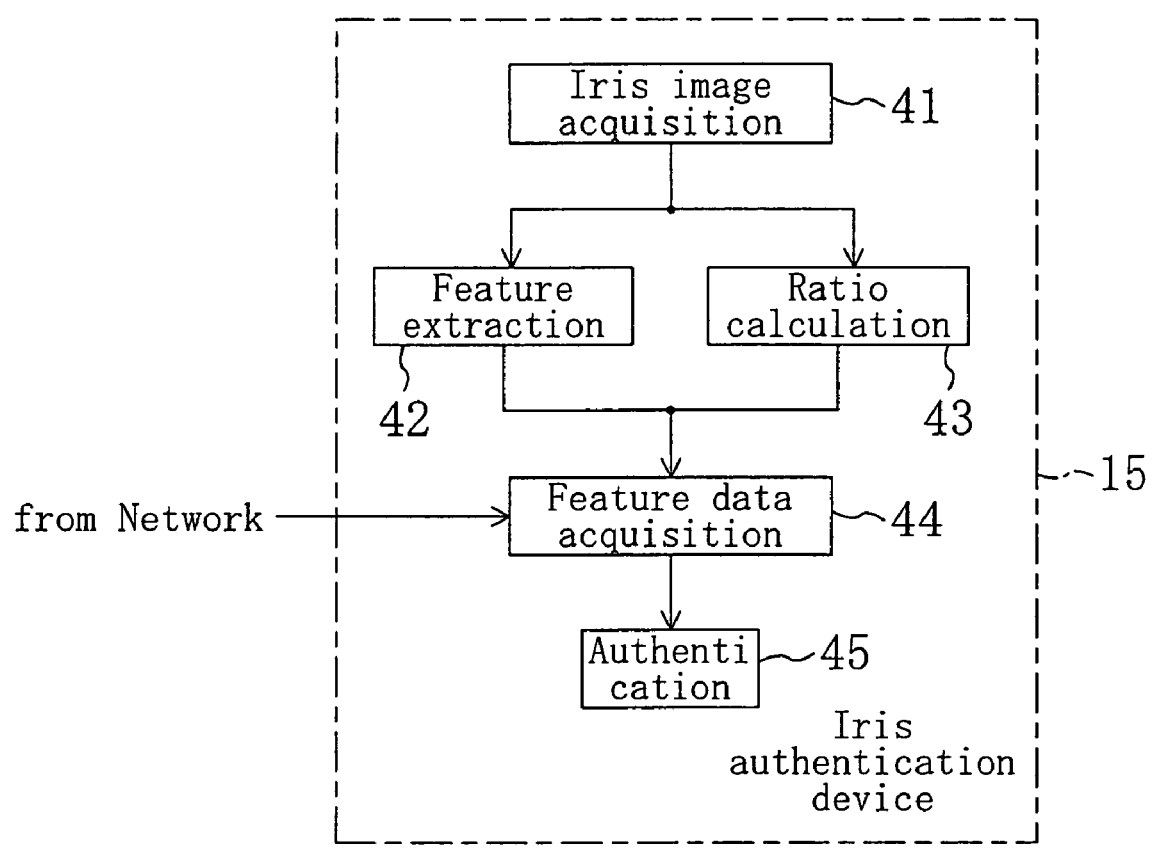
FIG. 4 shows a structure of an iris authentication device according to embodiment 1 of the present invention.

FIG. 4 shows a structure of an iris authentication device in the authentication system of FIG. 2. As shown in FIG. 4, the iris authentication device 15 includes an iris image acquisition section 41 for acquiring an iris image of a person to be authenticated, a feature extraction section 42 for extracting feature data from the acquired iris image, a ratio calculation section 43 for calculating the pupil diameter-iris diameter ratio in the acquired iris image, a feature amount acquisition section 44 for referring to the iris database 12 through the network 13 and comparing the pupil diameter-iris diameter ratios to selectively acquire the feature data of an item to be collated, and an authentication section 45 for comparing the feature data of the item to be collated with the acquired feature data to perform authentication.

Alternatively, it is possible that the iris authentication device 15 only captures iris images for authentication and transmits the captured iris image to the iris authentication server 11, while generation of iris codes is performed in the iris authentication server 11. Still alternatively, it is possible that comparison with a registered iris code is performed at the iris authentication server 11, and the iris authentication device 15 receives only an authentication result. The iris authentication device 15 may include all of the functions of the iris authentication server 11, the iris database 12, the iris registration device 14 and the iris capturing device 16 of FIG. 2 such that registration, storage of iris data and authentication are performed in a single device.

Figure 5:
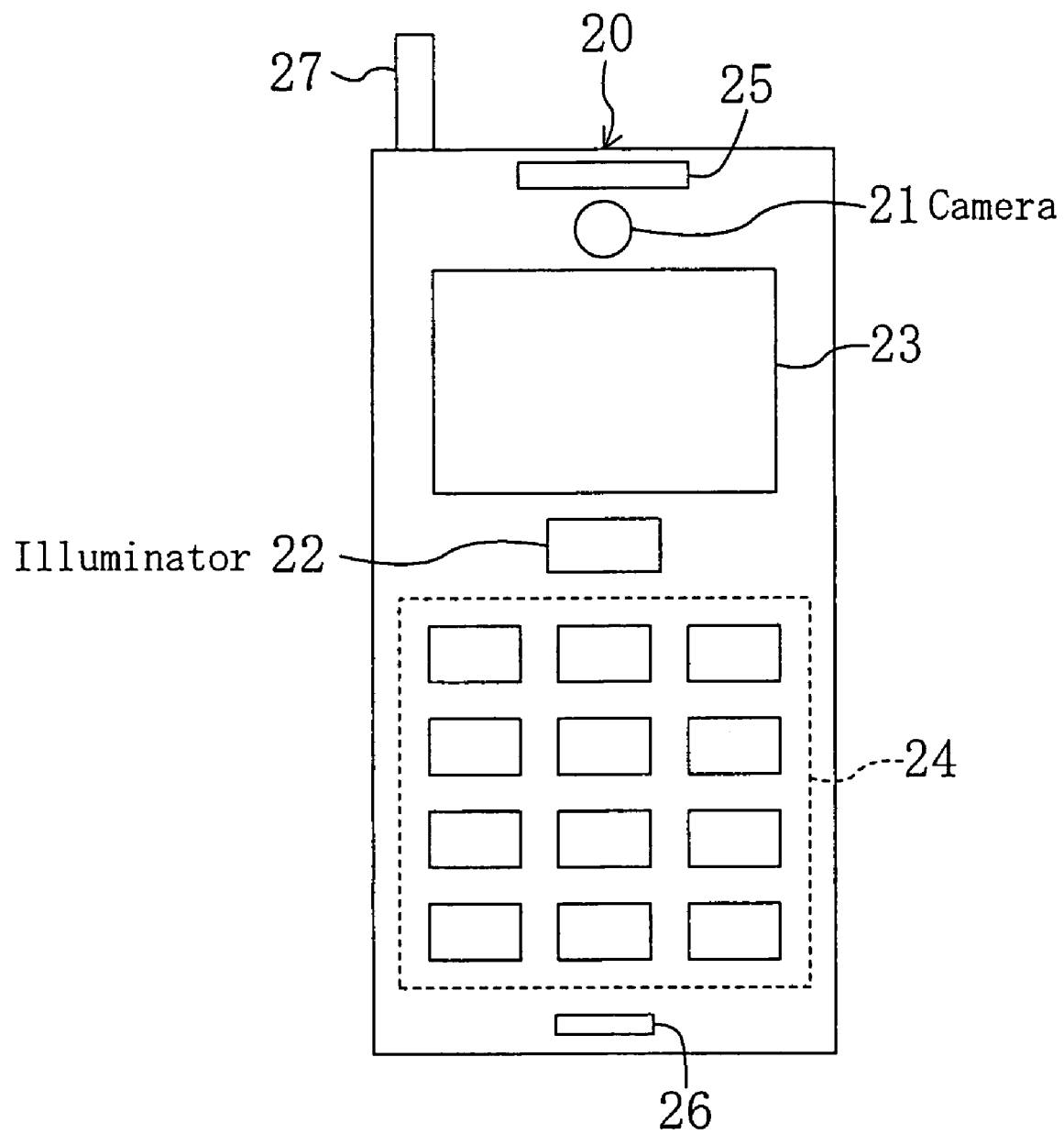
FIG. 5 shows the appearance of a cellular mobile phone having an authentication function, which is an example of the iris authentication device.

FIG. 5 shows the appearance of a cellular mobile phone having an authentication function, which is an example of the iris authentication device 15 of embodiment 1. The cellular mobile phone 20 of FIG. 5 includes a camera 21 for capturing iris images and an illuminator 22 for iris capturing in addition to the functions of an ordinary cellular mobile phone. Herein, the cellular mobile phone 20 includes a monitor 23, operation buttons 24, a loudspeaker 25, a microphone 26, an antenna 27, etc., in addition to the camera 21 and the illuminator 22. The illuminator 22 includes one or more infrared LEDs. The camera 21 is provided with a visible-light cut filter so as to receive only infrared components. The monitor 23 displays an iris image which is being captured and a result of authentication.

In embodiment 1, a person who is to be authenticated uses the cellular mobile phone having an authentication function shown in FIG. 5 to perform iris authentication under various environments irrespective of whether it is outdoor or indoor or whether it is daytime or nighttime.

Figure 6:
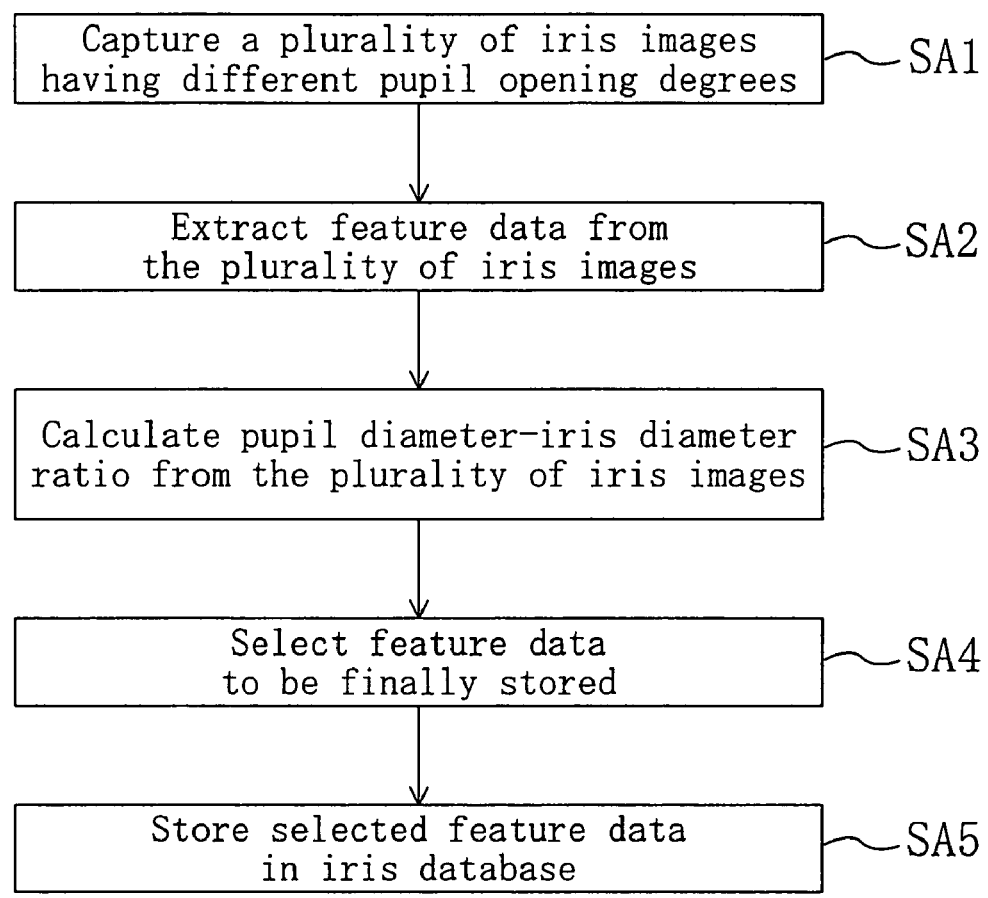
FIG. 6 is a flowchart illustrating the process performed at the time of registration according to embodiment 1 of the present invention.

FIG. 6 is a flowchart which illustrates the process performed at the time of registration according to embodiment 1. The process performed at the time of registration (registration process) in a personal authentication method of embodiment 1 is described in accordance with the flow of FIG. 6.

In the first place, a registrant uses the iris capturing device 16 to capture a plurality of iris images having different pupil opening degrees (SA1). At the iris capturing device 16, the capturing section 32 is capable of continually capturing a plurality of iris images. The emission intensity of the illuminator 31 is controlled by the illumination controlling section 33. Herein, it is assumed that, in the process of continually capturing a plurality of iris images of a registrant by the capturing section 32, the illumination controlling section 33 turns off, at a predetermined timing, the illuminator 31 which has been on at the start of the capturing process.

Figure 7:
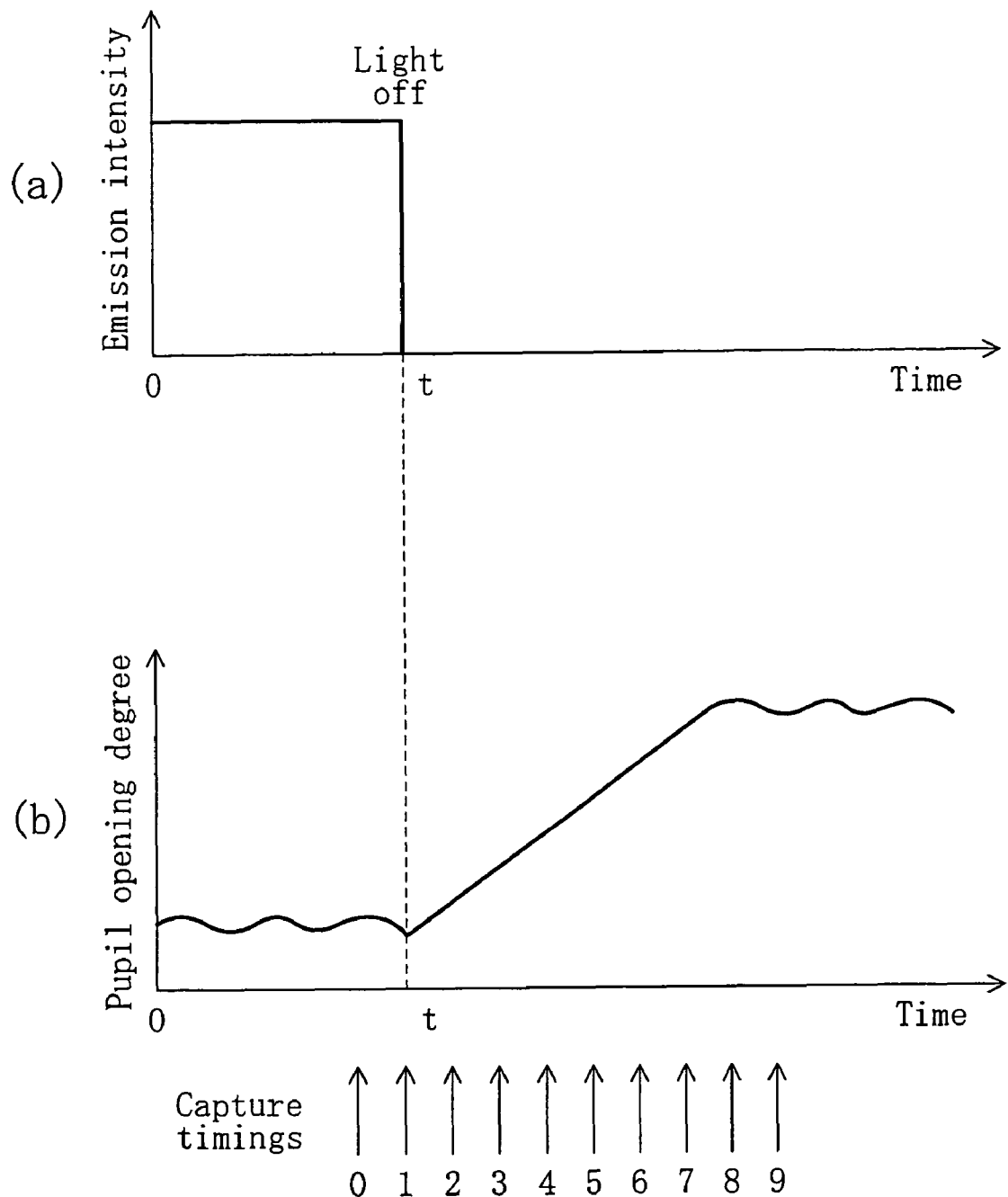
FIG. 7 is a graph showing variations in the illumination control and pupil opening degree together with the capture timings at the time of capturing iris images.

FIG. 7 is a graph showing variations in the illumination control and pupil opening degree together with the capture timings. As shown in FIG. 7, in embodiment 1, the illuminator 31 which emits light with uniform emission intensity is turned off at time t. Before time t, i.e., when the illuminator 31 emits uniform light, the pupil opening degree is substantially constant. It should be noted, however, that the pupil of a human eye incessantly repeats contraction and expansion even in a constant brightness environment although the contraction and expansion are slight. Thus, the pupil opening degree exhibits a slight vibrating change as shown in FIG. 7(b). At time t, the illuminator 31 is turned off by the illumination control section. Then, the pupil gradually expands till it adapts to the brightness. After adaptation is achieved, the pupil repeats slight contraction and expansion. During the course of such a process, the capturing section 32 continually captures a plurality of iris images (herein, 10 iris images) at capture timings shown in FIG. 7(b). The capture timings desirably occur within a period of several to ten-and-several seconds which starts immediately before time t and ends with a fully-expanded state of the pupil.

As described above, a plurality of iris images having various pupil opening degrees are captured while the visible light illumination intensity is changed. In this example, it is only necessary to turn off the illuminator 31 which has been on at the start of capturing. Therefore, complicated illumination control is not required. Further, since the illumination brightness is decreasingly changed, a pain which can be caused in a registrant due to glare is reduced. Conversely, if the illumination brightness is increasingly changed, a registrant feels a more intense glare, and thus, such illumination control is less preferable.

A preferable device for capturing iris images for personal authentication include an illuminator for illuminating a facial area of a registrant with visible light, an illumination control section for controlling the emission intensity of the illuminator, and a capturing section for capturing iris images of the registrant. In the process of continually capturing a plurality of iris images of the registrant, the illumination control section preferably turns off, at a predetermined timing, the illuminator which has been on at the start of capturing.

Since the illuminator is simply switched from an ON state to an OFF state in the process of capturing iris images, complicated illumination control is not necessary. Therefore, a plurality of iris images having different pupil opening degrees are captured in a quite simple manner. Since the illumination intensity is decreasingly changed, a registrant is not subjected to an excessive pain that may be caused due to glare.

As a matter of course, it is possible that capturing of iris images is performed in a room with a window wherein the environmental brightness is changed by closing the curtains to intercept external light at a predetermined time instead of turning off the illuminator. Alternatively, the brightness may be changed in a stepwise fashion instead of turning on/off the illuminator.

The iris capturing device is desirably installed in a room which does not allow the incoming of external light. In such a place, an iris image with an extremely-contracted pupil can be captured with high illumination intensity, while an iris image with an extremely-expanded pupil can also be captured after the illuminator is turned off because external light does not come in the room. Further, iris images having different pupil opening degrees between the fully-contracted state and the fully-expanded state can be captured in a stepwise fashion.

Then, feature data is extracted from each of the plurality of iris images captured at step SA1 (SA2). In the iris registration device 14, the iris image acquisition section 34 acquires the iris images captured by the iris capturing device 16. The feature extraction section 35 extracts feature data from the plurality of acquired iris images. Herein, a method disclosed in Document 2 (Japanese Unexamined PCT National Phase Publication No. 8-504979) is used. General features of the iris authentication method of Document 2 are as shown below:

(1) Determine the iris perimeter (iris/sclera border) and the pupil perimeter (pupil/iris border) to extract an iris region;
(2) Transform the extracted iris region from the xy-rectangular coordinate system to the rθ-polar coordinate system;
(3) Determine analysis regions (by dividing the iris region into 8 ring parts);
(4) Subject the iris region to a multi-scale 2-d Gabor filter and binarize a signal output from the Gabor filter. The binarized signal is used as an iris code;
(5) Compare (exclusive OR) an iris code generated at the time of authentication with an iris code registered in advance to calculate the hamming distance between the two compared codes; and
(6) If the hamming distance is lower than a threshold value, accept the user as a registrant but otherwise reject as a non-registrant.

FIG. 8(a) shows the positions of the iris perimeter and the pupil perimeter for Step (1). FIG. 8(b) shows an area enclosed by the iris perimeter and the pupil perimeter, which is extracted as an iris region and expressed in the xy-rectangular coordinate system. At this point in time, the effect of translation of the iris region has been absorbed. FIG. 8(c) shows the iris region expressed in the rθ-polar coordinate system where the center of the pupil is at the center of the system (transformation of Step (2)). Actual pupil perimeter and iris perimeter are not perfect circles. In the case where the pupil perimeter and iris perimeter are approximated to a circle, the center of the pupil and the center of the iris are not identical (i.e., the pupil and iris are eccentric). However, the value of r at the pupil perimeter is set to 0 and the value of r at the iris perimeter is set to 1, whereby the eccentricity, the difference in the degree of opening of the pupil and the effect of expansion/contraction of the pupil are absorbed.

Figure 9:
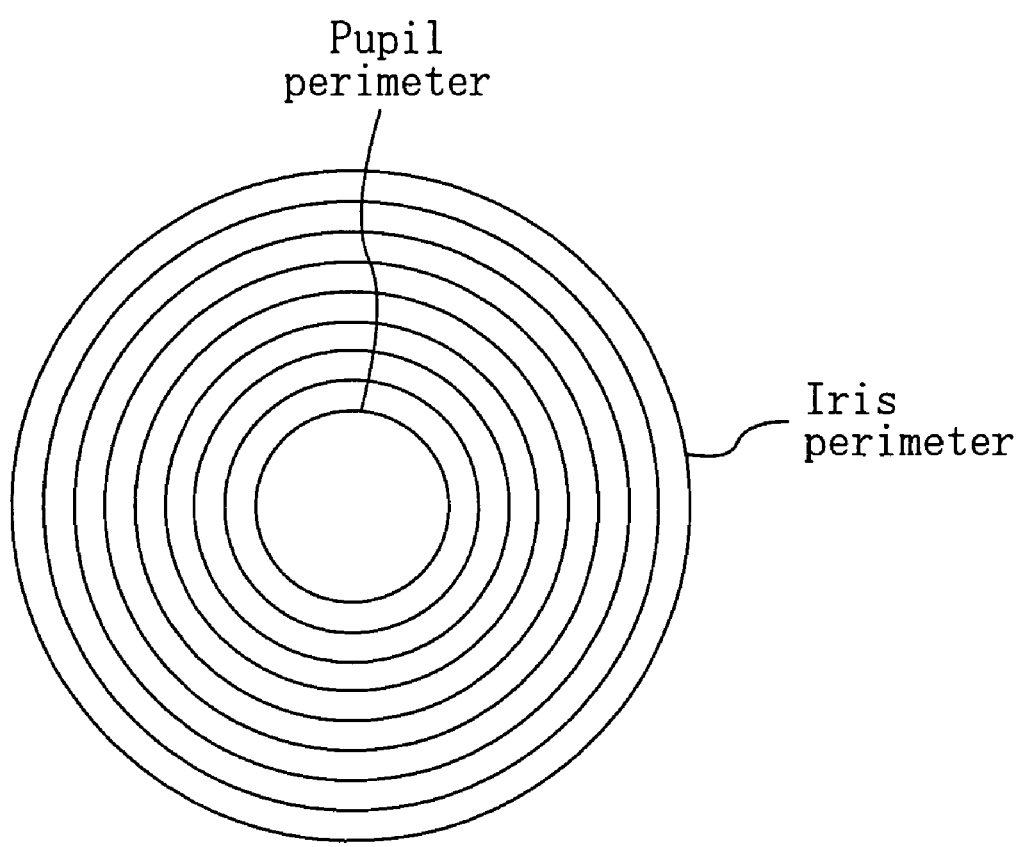
FIG. 9 shows analysis regions.
Figure 10:
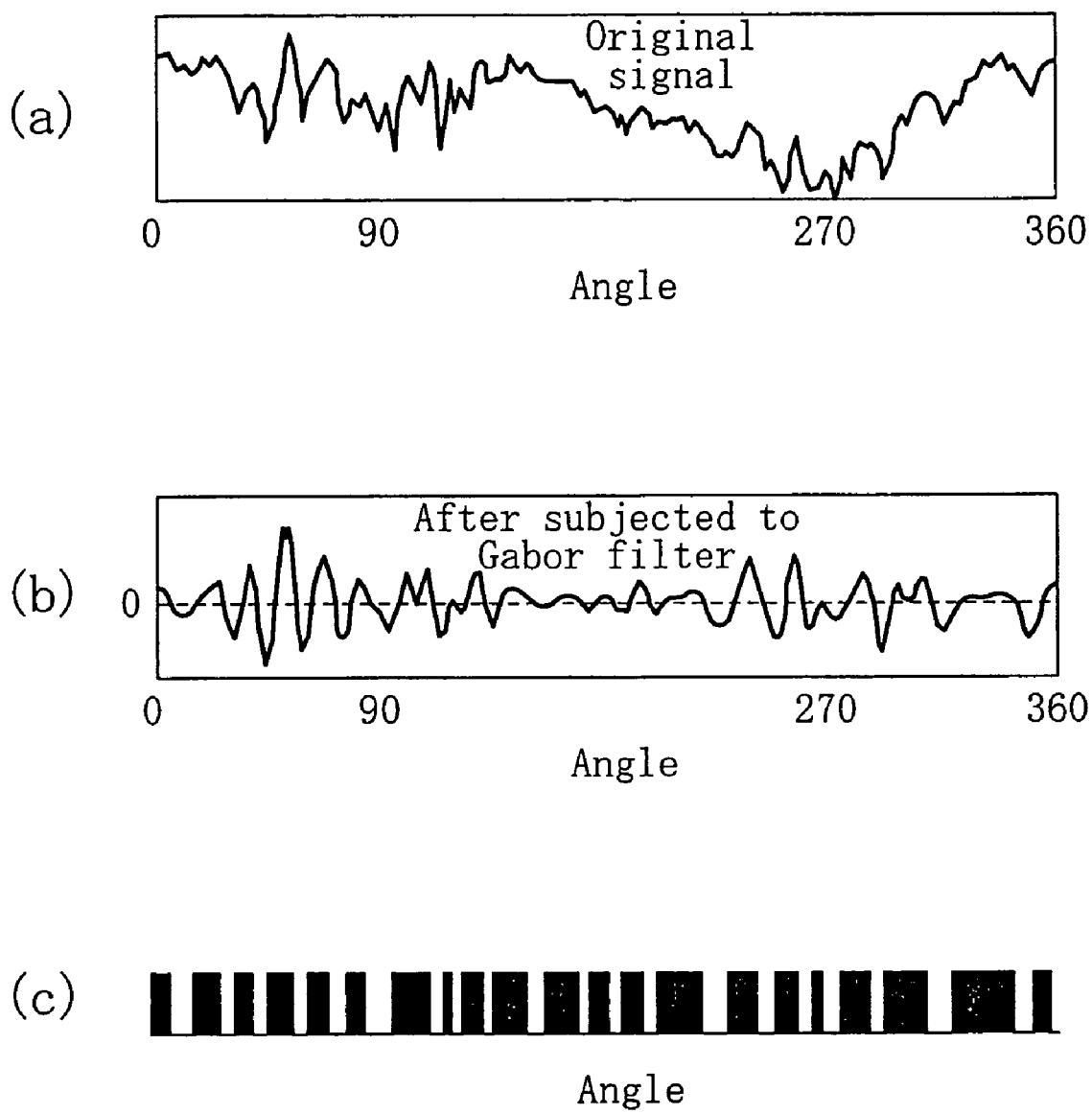
FIG. 10 illustrates generation of an iris code.

FIG. 9 shows 8 ring-shaped analysis regions determined at Step (3). FIG. 10 illustrates generation of an iris code at Step (4) wherein brightness signal (a) obtained after the analysis regions of FIG. 9 have been determined is subjected to a Gabor filter (signal (b)), and a resultant signal is binarized (signal (c)). Although the signal is actually a two-dimensional signal, but it is shown in the form of a one-dimensional signal for simplicity of illustration. Signal (a) is an angular direction brightness signal in one of the 8 rings. Although, in an actual case, a multi-scale Gabor filter is employed and even a single-scale Gabor filter includes a real part and an imaginary part, signals (b) and (c) are the results derived from the real part of the Gabor filter for a certain scale. The position of each bit of the binary iris code (c) obtained by binarization based on the level (positive or negative) of the Gabor filter output corresponds to a certain position over the iris image.

Processes (1) to (6) are performed on a plurality of iris images as described above, whereby the iris codes from which the effects of translation, scale, the difference in the degree of opening of the pupil, the eccentricity of the pupil, etc., are removed, are generated from the plurality of iris images.

Then, the pupil diameter-iris diameter ratio is calculated for each of the plurality of acquired iris images (SA3). This process is performed by the ratio calculation section 36 of the iris registration device 14. Herein, the pupil perimeter is fitted to a circle having a radius of rp and the iris perimeter is fitted to a circle having a radius of ri, and pupil diameter-iris diameter ratio R is defined as:

$$R = rp/ri$$

Each of the iris codes extracted from a plurality of iris images having different pupil opening degrees is associated with corresponding pupil diameter-iris diameter ratio R.

In embodiment 1, the pupil diameter-iris diameter ratio is used as "pupil opening degree index" for expressing the pupil opening degree. The reasons for that are now described. For example, the "pupil diameter" itself can be employed as a parameter for expressing the degree of opening of the pupil. In this case, it is necessary to satisfy a condition that an image of an iris can be captured at a constant size (number of pixels). However, in the case where an iris authentication function is added to a portable device, such as a cellular mobile phone, a PDA, or the like, a registrant shoots images of his/her iris by himself/herself with a portable device having a camera in his/her hand. Thus, there is no guarantee that the distance between the camera and the eye at the time of capturing images is kept constant. In general, the distance readily varies. Accordingly, the size of an iris area itself changes over an iris image. Thus, the pupil opening degree cannot be correctly expressed only with the pupil diameter. In the case where the pupil diameter-iris diameter ratio is used as the pupil opening degree index as in embodiment 1, the pupil opening degree can be correctly expressed even when the size of an iris region is not constant over an image.

Alternatively, the environmental brightness measured at the time of capturing iris images may be used as the pupil opening degree index. For example, the illuminance (unit: lx) can be used as the environmental brightness. Since the pupil of a human eye contracts or expands according to the environmental brightness, the pupil opening degree can be generally expressed according to the value of illuminance. The position of a sensor for measuring the illuminance is desirably in the vicinity of the position of an eye of a registrant whose iris image is to be captured. However, in the case where it is difficult to provide the sensor at such a position, the sensor may be provided at another position. For example, the sensor may be incorporated in a device that captures iris images.

Next, feature data to be stored is selected (SA4). In embodiment 1, 10 iris images are captured from a registrant as shown in FIG. 7. Although all of iris codes obtained from the 10 iris images may be registered in the iris database 12, the minimum necessary number of iris codes are selected in this example in order to reduce the amount of data stored in the iris database 12.

Specifically, selection of iris codes is carried out through a process described below. In the first place, the iris codes are sorted in an increasing (or decreasing) order of pupil diameter-iris diameter ratio R, and the sorted iris codes are numbered. Then, the hamming distance between different iris codes is calculated. A calculation method used herein is the same as that used for calculation of the hamming distance in an authentication process which will be described later.

Figures 11, 12:
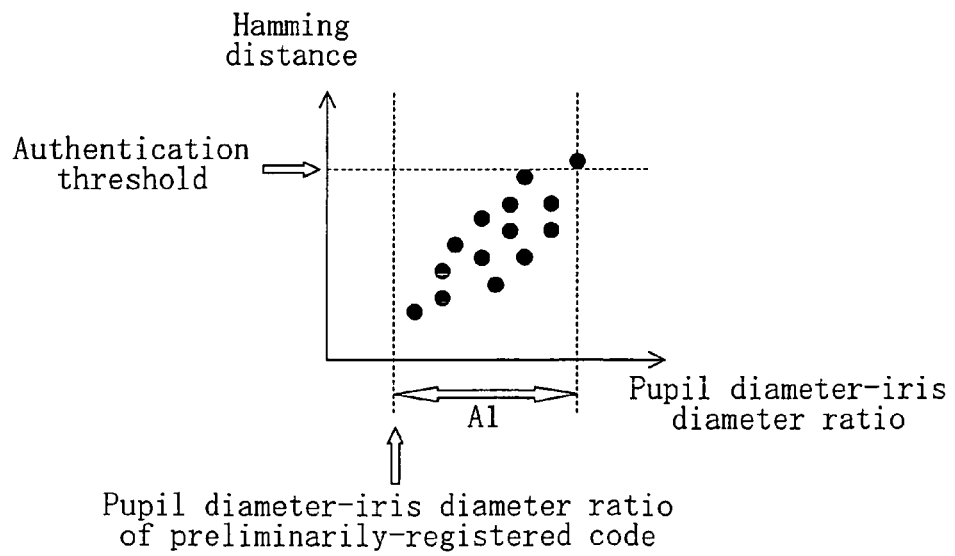
FIG. 11 is a matrix of the hamming distance between iris codes.
FIG. 12 is a graph over which the hamming distance between iris codes is plotted.

In embodiment 1, 10 iris codes are prepared, and accordingly, 45 (=10C2) possible hamming distances are derived. As a result, a matrix of hamming distances is obtained as shown in FIG. 11. Strictly explaining, since the iris pattern does not uniformly contract, the hamming distance decreases as values R of the pupil diameter-iris diameter ratios of the iris codes become closer to each other. As values R become more distant from each other, the hamming distance increases.

Then, it is determined for each iris code whether or not the hamming distances from two adjacent iris codes are equal to or greater than a predetermined threshold value. If both of the two hamming distances are smaller than the threshold value, it is determined that the iris code is omittable. The predetermined threshold value is, for example, 0.20.

Specifically, for example, iris code 1 is examined in FIG. 11, the hamming distance from iris code 0 is 0.15, and the hamming distance from iris code 2 is 0.16. Since both of the hamming distances are smaller than the threshold value, i.e., 0.20, it is determined that iris code 1 is omittable. This determination is based on the principle that even if an iris code obtained at the time of authentication is approximate to iris code 1, authentication is determined to be successful by comparison with iris code 0 or iris code 2, and hence, iris code 1 is omittable.

Thereafter, the row and column of iris code 1 are deleted from the table of FIG. 11, and the same operation is repeated. Then, iris code 2 is examined. The hamming distance from iris code 0 is 0.20, which is not smaller than the threshold value. Thus, it is determined that iris code 2 is not omittable. Then, iris code 3 is examined. The hamming distance from iris code 2 is 0.14, and the hamming distance from iris code 4 is 0.13. Since both of these distances are smaller than the threshold value, it is determined that iris code 3 is omittable. Such a process is repeated, and in the last, 6 iris codes, iris code 0, iris code 2, iris code 4, iris code 6, iris code 8 and iris code 9, are selected.

In this way, the hamming distances between iris codes are referred to determine iris codes to be finally stored, whereby the amount of data stored in the iris database 12 is reduced.

Various methods are possible for selecting feature data to be stored in the iris database other than a method which uses the hamming distance of an iris code. For example, the pupil diameter-iris diameter ratio may be used. For example, a piece of feature data may be selected from the feature data whose pupil diameter-iris diameter ratios are within each one of the ranges of 0.1 to 0.3, 0.3 to 0.5, and 0.5 to 0.7. Still other factors, for example, whether or not the degree of opening of an eye is sufficiently large, whether or not a captured image is blurred due to a blink or a movement of a subject of image capturing, whether or not a focus value is adjusted, etc., may be used as selection criteria.

Selection of iris codes may be carried out using the following method. Where any one of a plurality of extracted iris codes is assumed to be actually registered, the graph of FIG. 12 is created from the hamming distances between this preliminarily-registered code and respective iris codes. In FIG. 12, the vertical axis denotes the hamming distance, and the horizontal axis denotes the pupil diameter-iris diameter ratio. Each dot in the graph corresponds to respective one of the iris codes except for the preliminarily-registered code.

From the graph of FIG. 12, range A1 of the pupil diameter-iris diameter ratio which satisfies the allowable FRR (false rejection rate: e.g., 1%) is obtained. The same process is performed on other iris codes to determine the range of the pupil diameter-iris diameter ratio which satisfies the allowable FRR. Iris codes are selected so as to entirely cover the possible range of the pupil diameter-iris diameter ratio, whereby a minimum necessary number of registration iris codes are determined.

It should be noted that a necessary condition for achieving the above method is that the number of pieces of iris data obtained at the time of registration is sufficiently large. At the time of authentication, there is a possibility that a false rejection occurs due to other factors (a focus error of a camera, concealment by the eyelid or eyelash, etc.). The ranges of the pupil diameter-iris diameter ratio which satisfies the allowable FRR slightly overlap each other.

As a result of the experimentations conducted by the present inventors, it was found that a registrant can be satisfactorily authenticated so long as at least three pieces of feature data obtained from an iris image of a contracted-pupil state, an iris image of a normal state, and an iris image of an expanded-pupil state are registered for one registrant. Herein, the contracted-pupil state means a case where the pupil diameter-iris diameter ratio is 0.1 to 0.3, the normal state means a case where the pupil diameter-iris diameter ratio is 0.3 to 0.5, and the expanded-pupil state means a case where the pupil diameter-iris diameter ratio is 0.5 to 0.7.

In the last, the iris codes (feature data) selected at step SA4 are stored together with the pupil diameter-iris diameter ratio (pupil opening degree index) in the iris database 12 (SA5). Herein, the feature transmission section 37 of the iris registration device 14 transmits the iris codes and the pupil diameter-iris diameter ratio to the iris database 12 through the network 13.

FIG. 13 schematically shows an example of data contents in the iris database 12, wherein N iris codes are registered in total for a plurality of registrants (M registrants). As shown in FIG. 13, the pupil diameter-iris diameter ratio is added as additional information to each iris code.

Figure 14:
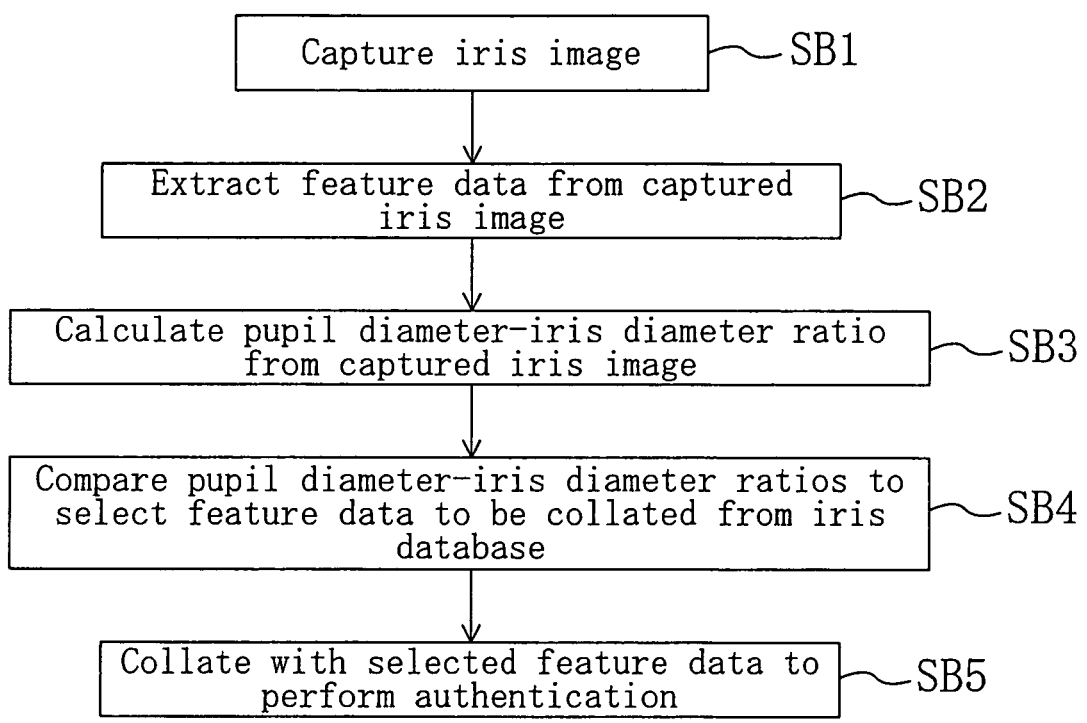
FIG. 14 is a flowchart illustrating the process performed at the time of authentication according to embodiment 1 of the present invention.

FIG. 14 is a flowchart illustrating the process performed at the time of authentication according to embodiment 1. The process performed at the time of authentication (authentication process) in an iris authentication method of embodiment 1 is described in accordance with the flow of FIG. 14.

Figures 20, 21:
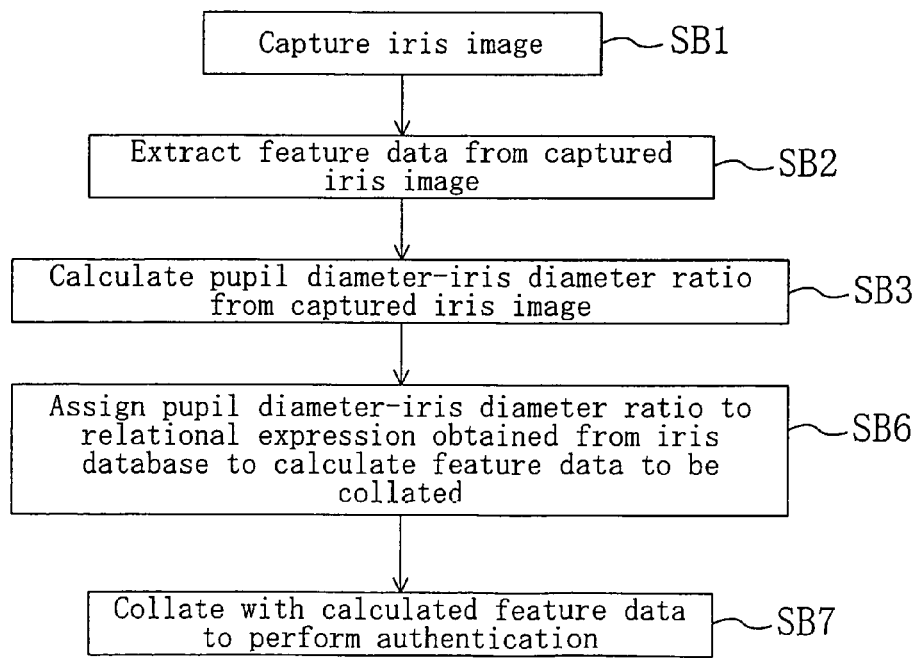
FIG. 20 shows an example of a data content in an iris database 12 according to embodiment 2 of the present invention.
FIG. 21 is a flowchart illustrating the process performed at the time of authentication according to embodiment 2 of the present invention.

In the first place, a person to be authenticated captures iris images using the iris image acquisition section 41 of the iris authentication device 15 (SB1). In the case where a transportable device, such as the cellular mobile phone 20 having an authentication function shown in FIG. 20, is used as the iris authentication device 15, authentication can be carried out irrespective of place and time. In the case of a daytime outdoor environment, an iris image of a pupil-contracted state is captured. In the case of nighttime or a dark place, an iris image of a pupil-dilated state is captured.

Then, the feature extraction section 42 extracts an iris code as feature data from the captured iris image (SB2), and the ratio calculation section 43 calculates the pupil diameter-iris diameter ratio as the pupil opening degree index from the captured iris image (SB3). The processes of steps SB2 and SB3 are the same as those of steps SA2 and SA3 performed at the time of registration, and therefore, descriptions thereof are herein omitted.

Then, the feature data acquisition section 44 selects an iris code to be collated from the iris database 12 by comparison of the pupil diameter-iris diameter ratios (SB4). Herein, an iris code which is registered together with a pupil diameter-iris diameter ratio close to the pupil diameter-iris diameter ratio calculated at the time of authentication is selected.

For example, in the case where pupil diameter-iris diameter ratio R in an iris image obtained at the time of authentication is 0.41 as in the example of FIG. 1, an iris code whose ratio R is close to 0.41 is acquired as an item to be collated from the iris database 12. FIG. 1 illustrates 1:N authentication wherein an ID of his/her own is not declared. In the case of 1:N authentication (identification), one iris code whose ratio R is closest to 0.41 is acquired for each of all the registrants registered in the iris database 12 as shown in FIG. 1. On the other hand, in the case of 1:1 authentication (verification) wherein an ID of his/her own is declared, one iris code whose ratio R is closest to 0.41 is acquired for a registrant corresponding to the declared ID.

Then, the authentication section 45 performs authentication by comparing the iris code extracted by the feature extraction section 42 and the iris code acquired by the feature data acquisition section 44 (SB5). Herein, the comparison is performed while relatively shifting the iris codes such that the effects of a tilt of the face and a rotational movement of an eyeball of a subject person are compensated as in the method of Document 2. The relative shift caused at the time of code comparison is realized by repeating a comparison process while iris codes are shifted in angular directions with respect to each other as if the iris code shown in FIG. 10(c) is wound into a cylindrical shape. The minimum hamming distance obtained by the shift is output as the final hamming distance. Authentication is performed based on whether or not the final hamming distance is equal to or greater than the threshold value. If it is equal to or greater than the threshold value, a person to be authenticated is determined to be a non-registrant. If it is smaller than the threshold value, the person to be authenticated is determined to be a registrant.

In the above-described example, the processes up to authentication are performed in the iris authentication device 15. However, it is instead possible that the processes up to feature extraction and ratio calculation (SB1 to SB3) are performed in an iris authentication device held by a person to be authenticated. The extracted feature data and the value of the pupil diameter-iris diameter ratio are transmitted to the iris authentication server 11, and acquisition of feature data and authentication (SB4 and SB5) are performed in the iris authentication server 11.

As described above, in embodiment 1, at the time of registration, a plurality of iris images having different pupil opening degrees are obtained from a registrant. A plurality of iris codes are extracted from the plurality of iris images and registered in conjunction with the pupil diameter-iris diameter ratio. At the time of authentication, an iris code to be collated is selected from the plurality of registered iris codes by comparing the pupil diameter-iris diameter ratios. Since an iris code extracted from an iris image whose pupil opening degree is substantially at the same level as that of an iris image captured at the time of authentication is selected as an item to be collated, personal authentication can be performed with a reduced false rejection rate irrespective of whether the pupil is at the contracted state or at the expanded state.

Since the pupil diameter-iris diameter ratio is used to reduce the number of iris codes to be collated, the collation time is greatly reduced in such a case of embodiment 1 as compared with a case where a plurality of iris codes having different pupil diameter-iris diameter ratios are simply registered, and an iris code having the smallest hamming distance is selected at the time of authentication.

Variations of Embodiment 1

In above-described example of embodiment 1, a plurality of iris images having different pupil opening degrees are obtained from a registrant at the time of registration, and a plurality of pieces of feature data respectively obtained from the plurality of iris images are registered in an iris database. Herein, a variation of embodiment 1 is described.

Figure 22:
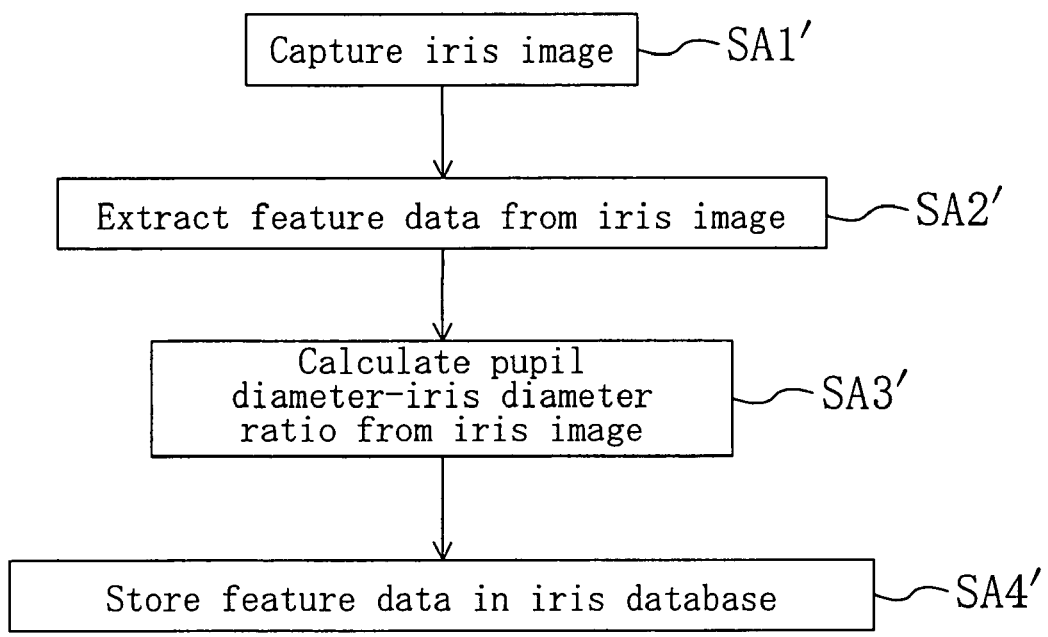
FIG. 22 is a flowchart illustrating the process performed at the time of registration in a variation of embodiment 1 of the present invention.

FIG. 22 is a flowchart illustrating the process performed at the time of registration in a variation of embodiment 1 of the present invention. The process performed at the time of registration (registration process) in a personal authentication method of a variation of embodiment 1 is described in accordance with the flow of FIG. 22.

In the first place, a registrant captures an iris image (SA1'). The differences from the previously-described example of embodiment 1 lie in that a plurality of iris images are not necessarily captured, and it is not necessary to use a device which can control the visible light illumination intensity, such as the iris capturing device 16. Herein, it is assumed that registration is performed using, for example, the portable device of FIG. 5.

Then, an iris code (feature data) is extracted from the iris image captured at step SA1' (SA2'). The pupil diameter-iris diameter ratio is calculated from the acquired iris image (SA3'). A method for extracting the iris code from the iris image and a method for calculating the pupil diameter-iris diameter ratio from the iris image are the same as those of the previously-described example of embodiment 1.

In the last, the iris code (feature data) is stored together with the pupil diameter-iris diameter ratio (pupil opening degree index) in the iris database 12 (SA4').

At this point in time, the iris registration device 14 or the iris authentication server 11 may check whether or not an iris code has already been registered for the same registrant. For example, if the iris code has already been registered, the pupil diameter-iris diameter ratios of the already-registered iris code and a new iris code are compared with each other. If the values of the pupil diameter-iris diameter ratios are close to each other, the new iris code is not stored. This is because even if a plurality of registered iris codes have a similar level of pupil diameter-iris diameter ratios, these iris codes do not provide much improvement in authentication accuracy but just requires a larger capacity of iris database for nothing in return. Determination as to whether or not the value of the pupil diameter-iris diameter ratio is close can be realized using a predetermined threshold value.

The registrant may perform the registration process of steps SA1' to SA4' a plurality of times without interruption or with intervals. In this case, the registration process is performed in environments of different ambient brightness, whereby iris images having different pupil opening degrees are obtained. Therefore, a plurality of iris codes having different pupil diameter-iris diameter ratios are registered.

The process performed at the time of authentication in this variation is the same as the previously-described example of embodiment 1. The process is described herein in accordance with the flow of FIG. 14.

The processes of steps SB1 to SB3 are the same as those of the previously-described example of embodiment 1, and therefore, descriptions thereof are herein omitted.

Then, the feature data acquisition section 44 compares the pupil diameter-iris diameter ratios from the iris database 12 to specify an iris code to be collated (SB4). Herein, an iris code which is registered together with a pupil diameter-iris diameter ratio close to the pupil diameter-iris diameter ratio calculated at the time of authentication is selected.

Figure 23:
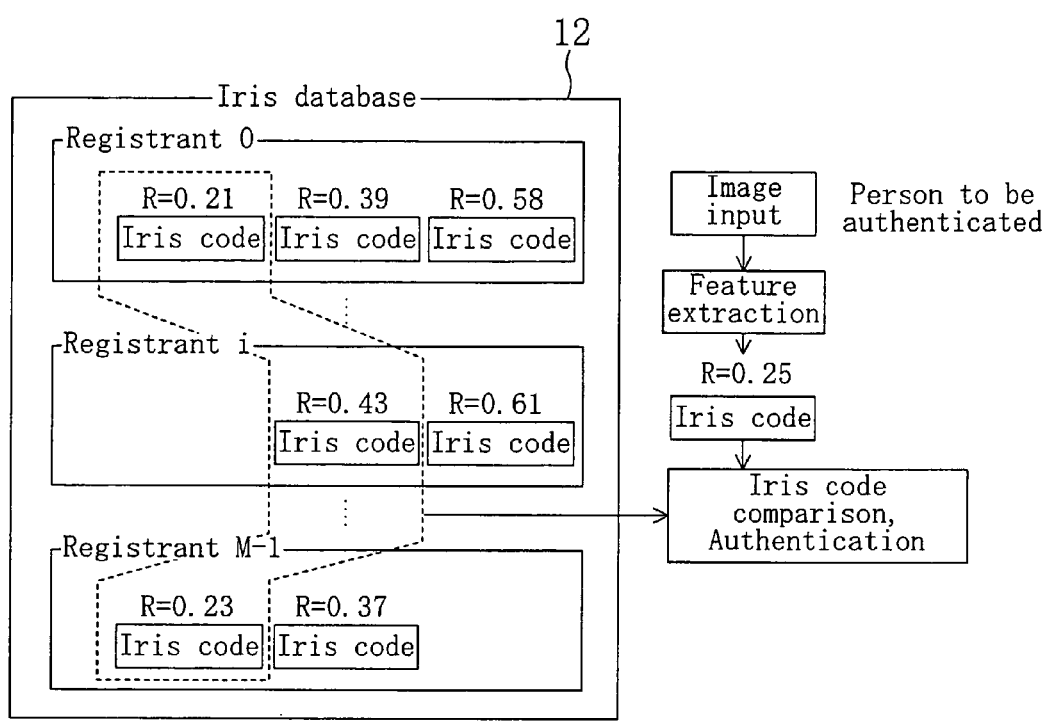
FIG. 23 conceptually illustrates the process performed at the time of authentication in a variation of embodiment 1 of the present invention.

For example, as shown in FIG. 23, in the case where pupil diameter-iris diameter ratio R in an iris image obtained at the time of authentication is 0.25, an iris code whose ratio R is close to 0.25 is acquired as an item to be collated from the iris database 12. FIG. 23 illustrates 1:N authentication wherein an ID of his/her own is not declared. In the case of 1:N authentication, one iris code whose ratio R is closest to 0.25 is acquired for each of all the registrants registered in the iris database 12 as shown in FIG. 23. On the other hand, in the case of 1:1 authentication wherein an ID of his/her own is declared, one iris code whose ratio R is closest to 0.25 is acquired for a registrant corresponding to the declared ID.

Then, the authentication section 45 performs authentication by comparing the iris code extracted by the feature extraction section 42 and the iris code acquired by the feature data acquisition section 44 (SB5). The process at step SB5 is the same as that of the previously-described example of embodiment 1, and therefore, descriptions thereof are herein omitted.

In this variation, at the time of registration, the pupil diameter-iris diameter ratio is given to an iris code to be registered, whereby an iris code whose pupil diameter-iris diameter ratio is closest can be specified as an item to be collated at the time of authentication. Thus, authentication is performed with a decreased false rejection rate. However, in this variation, a plurality of iris images having different pupil opening degrees are not captured while changing the brightness at the time of registration as are in the previously-described example of embodiment 1. Thus, in some cases, the pupil diameter-iris diameter ratios of registered iris codes do not occur with short intervals as shown in FIG. 23. Therefore, there is a possibility of an increase in the false rejection rate as compared with the previously-described example of embodiment 1.

Figure 24:
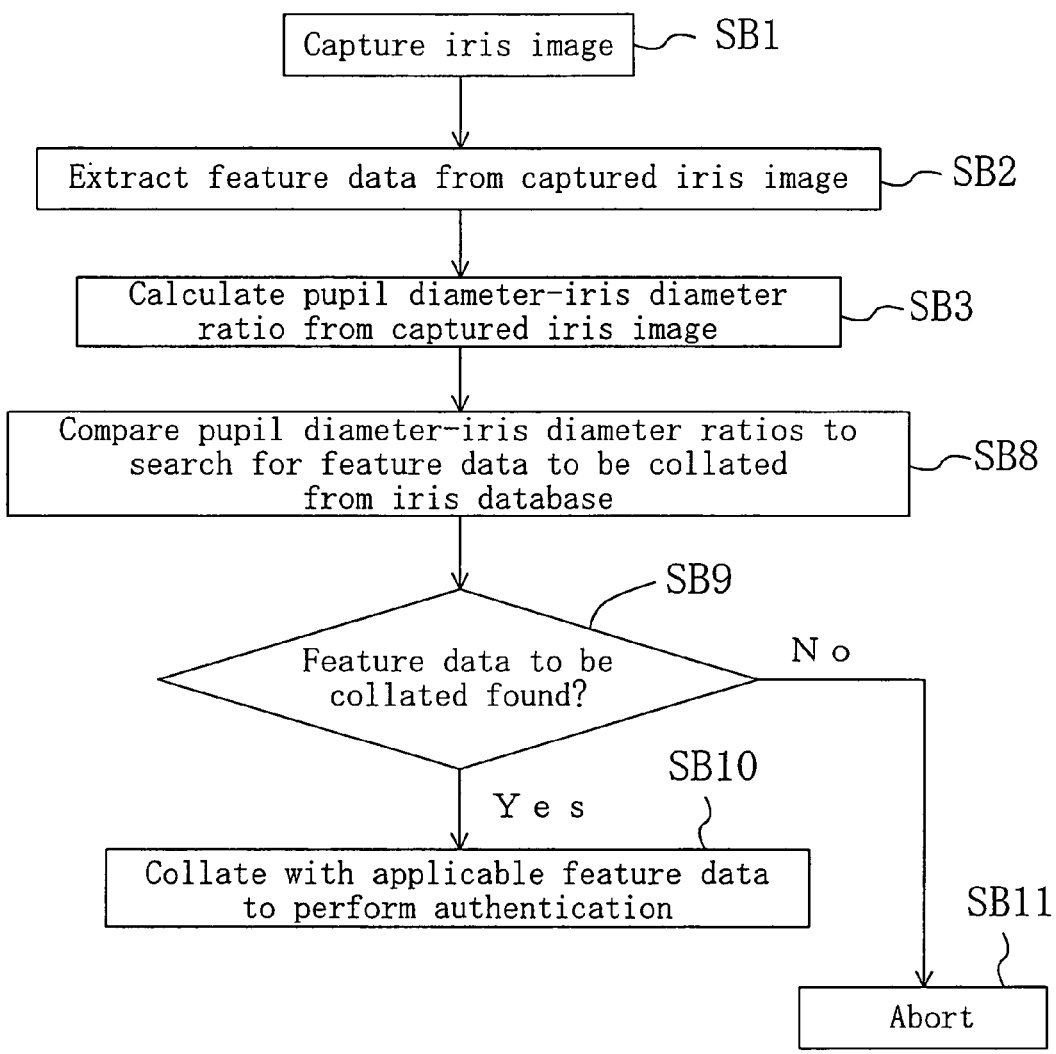
FIG. 24 is a flowchart illustrating the process performed at the time of authentication in a variation of embodiment 1 of the present invention.

In the case of 1:1 authentication, an authentication process shown in FIG. 24 may be performed in order to prevent an increase in the false rejection rate. The processes of steps SB1 to SB3 are the same as those of embodiment 1, and therefore, descriptions thereof are herein omitted.

Then, the feature data acquisition section 44 compares the pupil diameter-iris diameter ratios from the iris database 12 to specify an iris code to be collated (SB8). Herein, an iris code which is registered together with a pupil diameter-iris diameter ratio close to the pupil diameter-iris diameter ratio calculated at the time of authentication with a predetermined distance therebetween is searched for.

Figure 25:
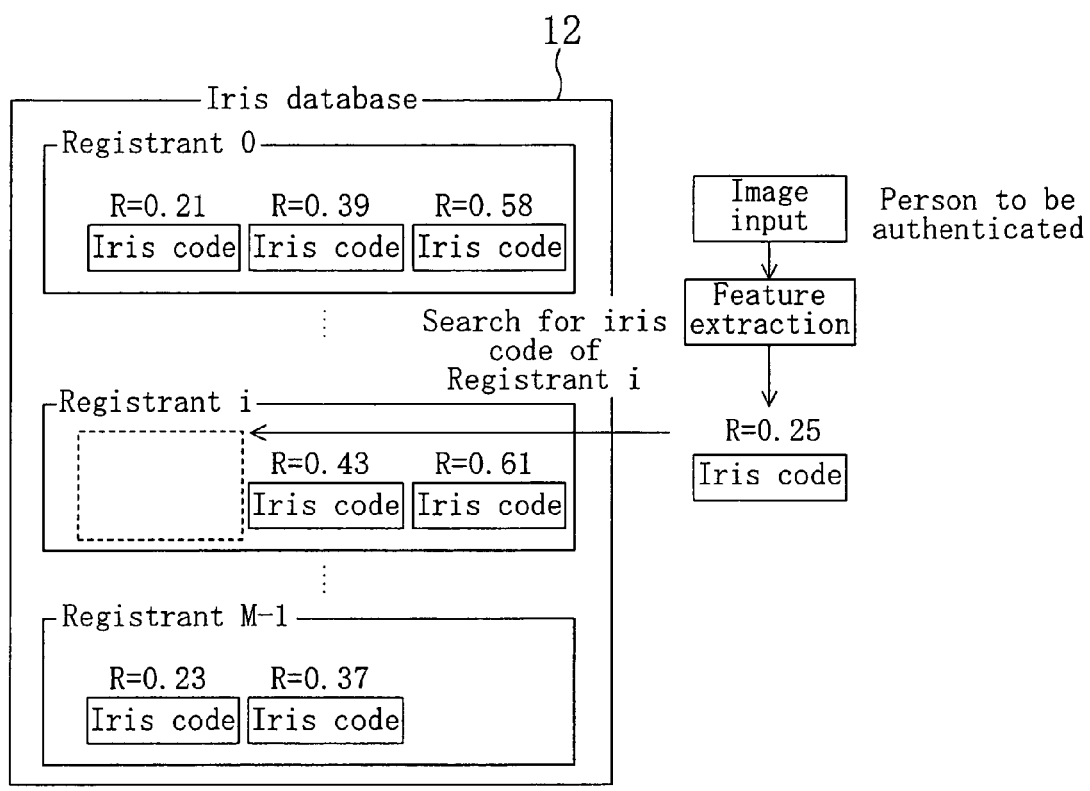
FIG. 25 conceptually illustrates the process performed at the time of authentication in a variation of embodiment 1 of the present invention.

For example, as shown in FIG. 25, in the case where pupil diameter-iris diameter ratio R in an iris image obtained at the time of authentication is 0.25, an iris code whose ratio R is within a predetermined range from 0.25 (herein, for example, ±0.15) is searched for in the iris database 12 as an item to be collated. FIG. 25 illustrates 1:1 authentication wherein an ID of his/her own is declared. Where the declared ID is i (ID=i), an iris code whose ratio R is within a range of 0.25±0.15 and closest to 0.25 is searched for through the iris codes of registrant i.

It is checked whether or not an iris code which applies to the above conditions exists (SB9). If such an iris code exists (Yes), authentication is performed using the iris code as an item to be collated (SB10). The process of step SB10 is the same as that of step SB5 in the previously-described example of embodiment 1, and therefore, descriptions thereof are herein omitted. If such an applicable iris code does not exist (No), the authentication process is aborted (SB11). In the example of FIG. 25, such an iris code does not exist, and therefore, the process proceeds to step SB11.

At step SB11, an advice about reduction of the false rejection rate may be given to a person to be authenticated in addition to simply aborting the authentication process. For example, preferable conditions for capturing of iris images are estimated based on the pupil opening degree index obtained at the time of authentication and the pupil opening degree index associated with registered feature data, and the person to be authenticated is advised to re-acquire an iris image under the estimated conditions. Herein, re-acquisition of iris images may be performed for re-authentication or may be performed for registration of new feature data. With such an arrangement, the false rejection rate is reduced, while convenience for a user is improved. Presentation of such an advice is realized, for example, through the monitor 23 of the cellular mobile phone 20 of FIG. 5.

In the example of FIG. 25, as for registrant i, the minimum value of the pupil diameter-iris diameter ratio of the registered iris code is 0.43, and the pupil diameter-iris diameter ratio obtained at the time of authentication is 0.25. In next authentication, the person to be authenticated is advised to capture an iris image in a darker place where the pupil diameter-iris diameter ratio is greater than 0.25. Alternatively, the person to be authenticated may be advised, for future authentication, to perform registration in a brighter place such that an iris code whose pupil diameter-iris diameter ratio is smaller than 0.43 is registered.

Embodiment 2

In embodiment 2 of the present invention, at the time of registration, a relational expression between the feature data and the pupil opening degree index is obtained, and parameters for expressing this relational expression are registered. Then, at the time of authentication, an extracted pupil opening degree index is assigned to a relational expression expressed by registered parameters to obtain feature data to be collated.

Figure 15:
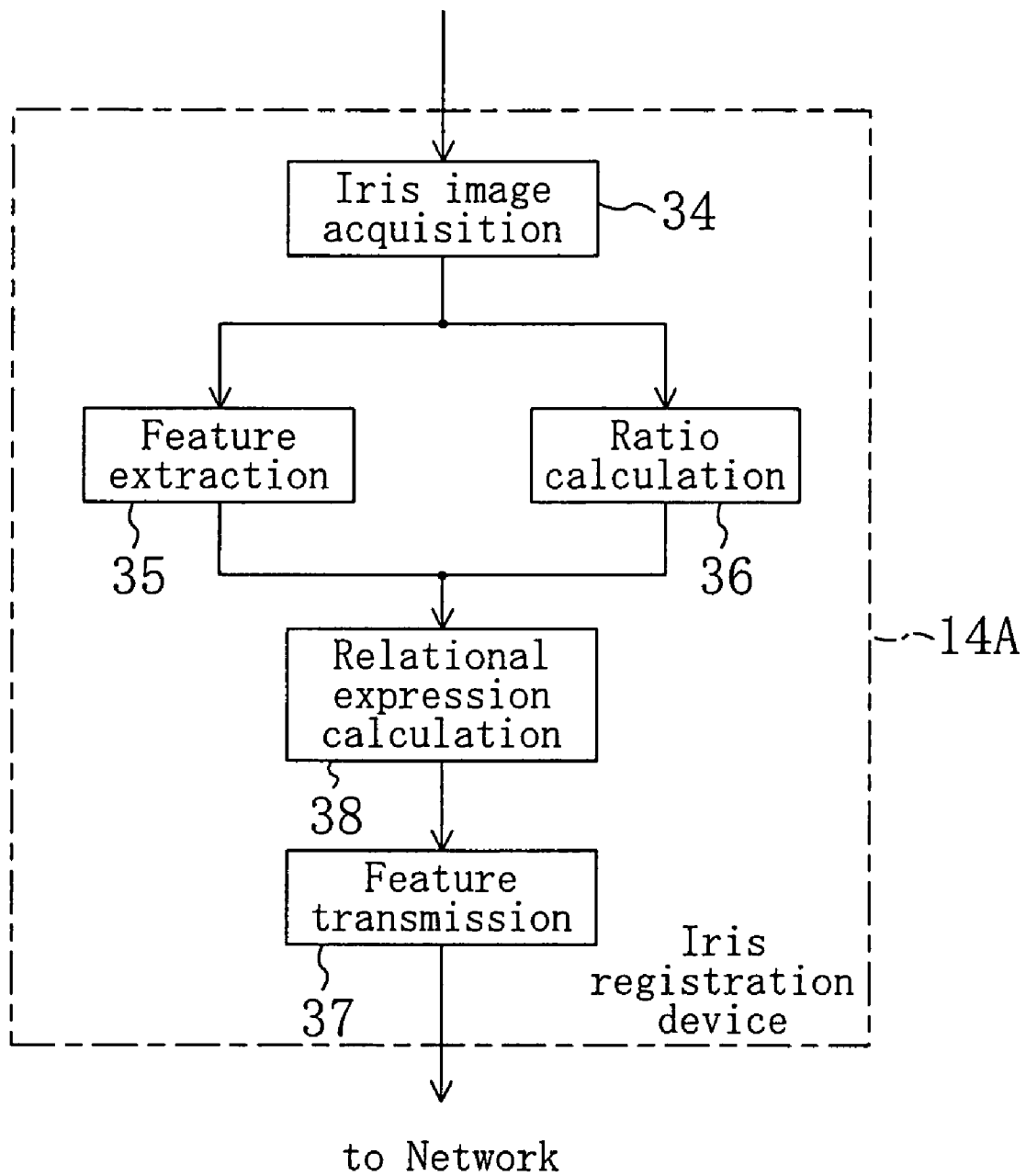
FIG. 15 is a block diagram showing a structure of an iris registration device according to embodiment 2 of the present invention.

A personal authentication method of embodiment 2 is realized by the authentication system of FIG. 2, for example. FIG. 15 is a block diagram showing a structure of an iris registration device 14A of embodiment 2, wherein like elements are denoted by like reference numerals used in FIG. 3. A relational expression calculation section 38 calculates a relational expression between the feature data and the pupil diameter-iris diameter ratio (pupil opening degree index) and obtains parameters which express this relational expression. A feature transmission section 37 transmits the parameters obtained by the relational expression calculation section 38 to the iris database 12.

Figure 16:
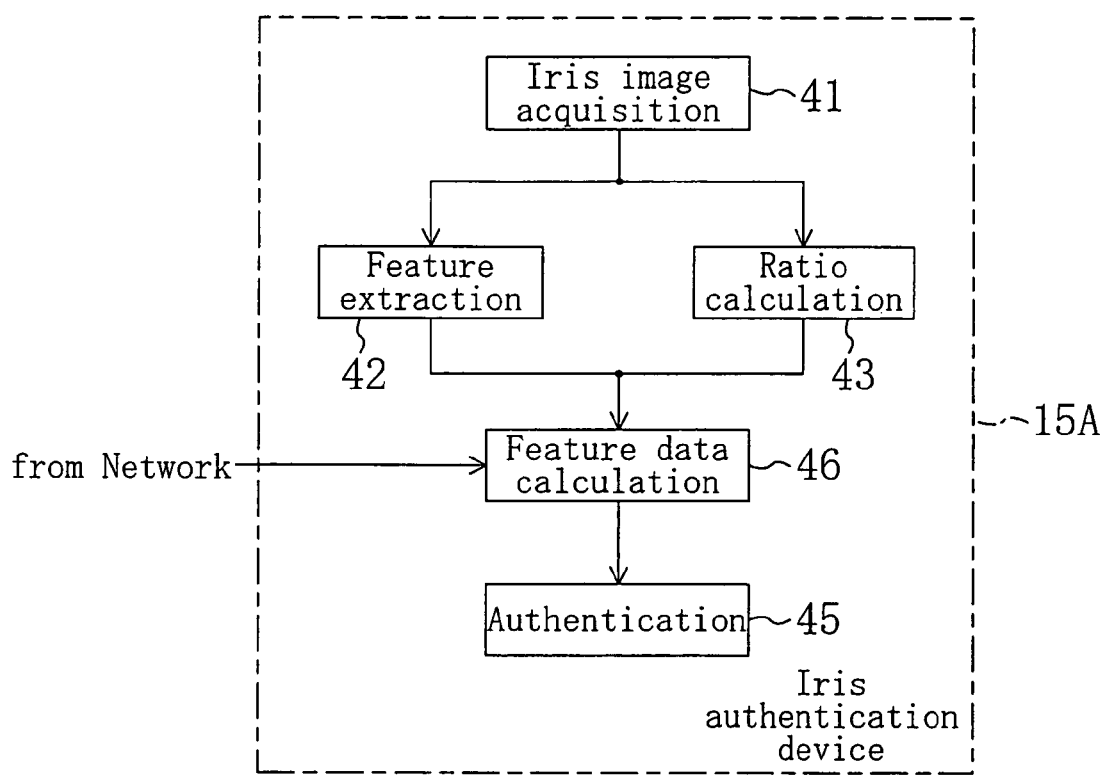
FIG. 16 is a block diagram showing a structure of an iris authentication device according to embodiment 2 of the present invention.

FIG. 16 is a block diagram showing a structure of an iris authentication device 15A of embodiment 2, wherein like elements are denoted by like reference numerals used in FIG. 4. A feature data calculation section 46 assigns a pupil diameter-iris diameter ratio obtained at the time of authentication to the relational expression expressed by the parameters registered in the iris database 12 to obtain feature data to be collated.

Figure 17:
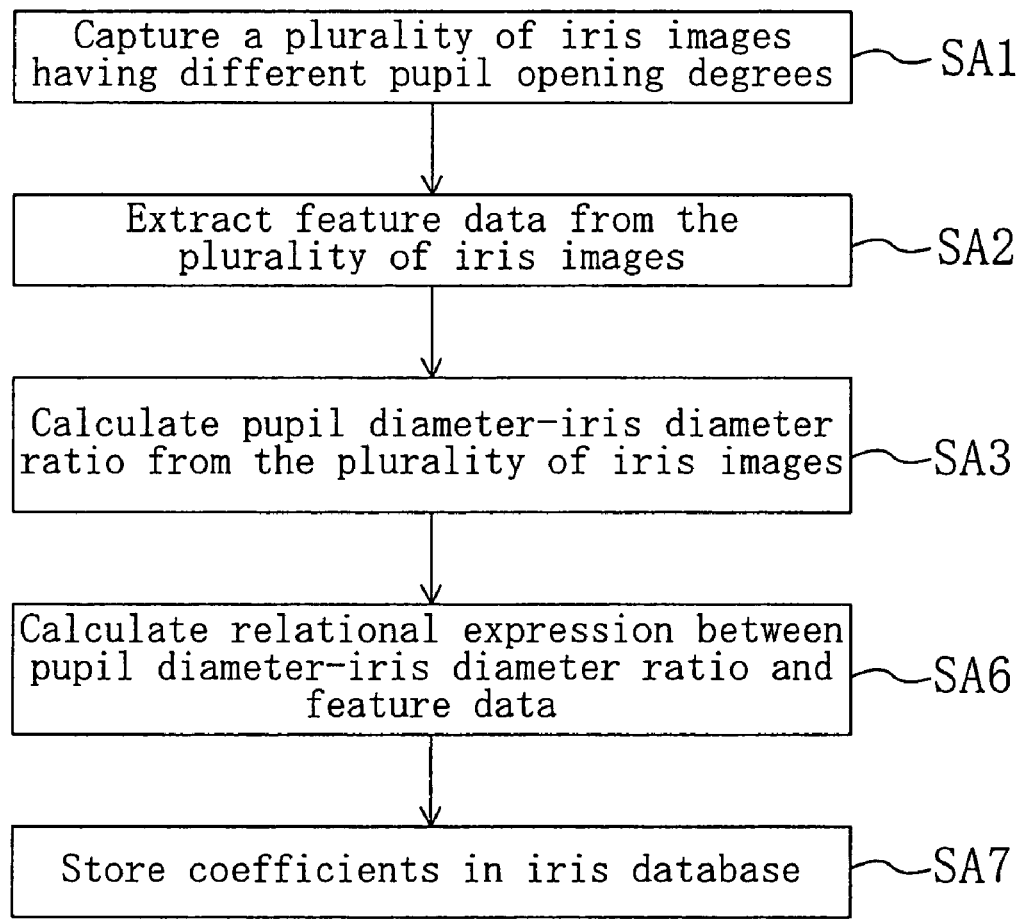
FIG. 17 is a flowchart illustrating the process performed at the time of registration according to embodiment 2 of the present invention.

FIG. 17 is a flowchart showing the process performed at the time of registration according to embodiment 2. The process performed at the time of registration (registration process) in a personal authentication method of embodiment 2 is described in accordance with the flow of FIG. 17.

The processes at steps SA1 to SA3 are the same as those of embodiment 1. The iris capturing device 16 captures a plurality of iris images having different pupil opening degrees for a registrant (SA1). A feature extraction section 35 of the iris registration device 14A extracts iris codes (feature data) from the plurality of iris images (SA2). The ratio calculation section 36 of the iris registration device 14A calculates the pupil diameter-iris diameter ratios from respective one of the plurality of iris images (SA3). It should be noted that, at step SA2, a signal shown in FIG. 10(*b*), which has been obtained by subjecting an image expressed in a polar coordinate system to a Gabor filter, is stored for each iris image together with an iris code.

Figure 18:
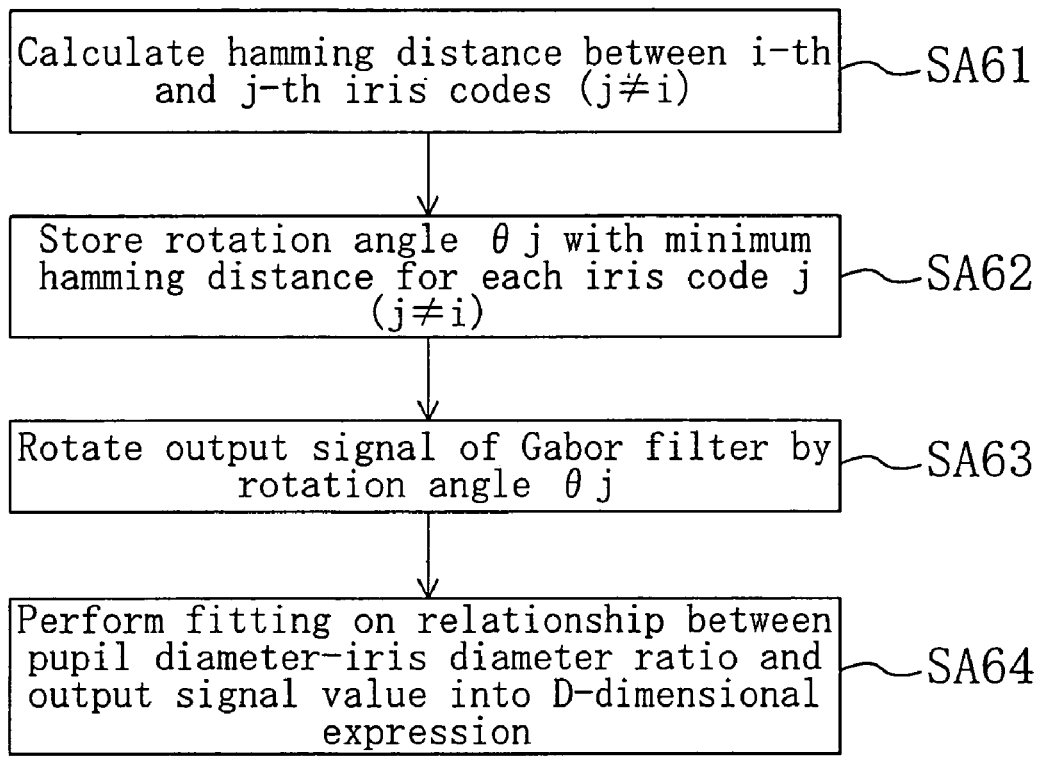
FIG. 18 is a flowchart illustrating details of the process performed at step SA6 in the flow of FIG. 17.

Then, the relational expression calculation section 38 of the iris registration device 14A calculates a relational expression between the pupil diameter-iris diameter ratio and the feature data for each dimension (SA6). FIG. 18 is a flowchart showing details of the process at step SA6.

In the first place, among the plurality of iris codes (K iris codes) generated at step SA2, the hamming distance between the i-th code and the j-th code (j≠i) is calculated where the i-th code is a reference (SA61). A method employed herein for calculating the hamming distance between the codes is the same as that described in embodiment 1. At this step, the shift amount (rotation angle θj) obtained at the time of calculating the hamming distance is stored together with the hamming distance (SA62).

Each of the output signals of the Gabor filter which have been stored at step SA2 is rotated by rotation angle θj (SA63). At the last step, the values of the output signals at the same position are examined to perform fitting on the relationship between the value of the pupil diameter-iris diameter ratio and the output signal value with a polynomial (D-dimensional polynomial expression) (SA64).

Figure 19:
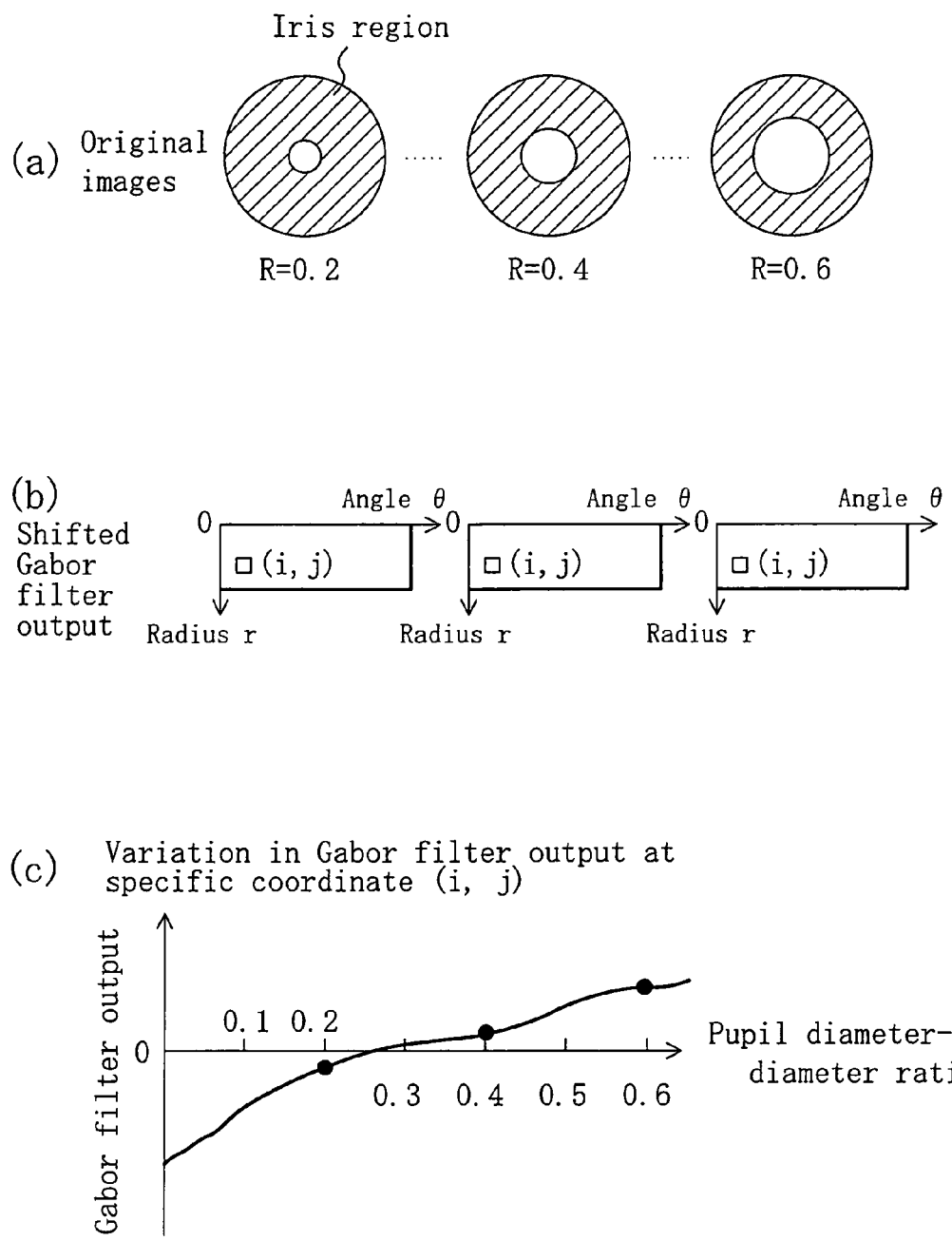
FIG. 19 is a flowchart conceptually illustrating the process performed at step SA6 in the flow of FIG. 17.

FIG. 19 conceptually illustrates the process of step SA6. FIG. 19(*a*) shows a plurality of iris images having different pupil opening degrees which are captured at step SA1 wherein an iris region is simply expressed by two concentric circles of the iris perimeter ant the pupil perimeter. Further, the values of pupil diameter-iris diameter ratio R calculated at step SA3 are shown together. FIG. 19(*b*) shows the Gabor filter outputs stored at step SA2 which have been shifted by a shift amount corresponding to the hamming distance calculated at step SA61. FIG. 19(*c*) shows a graph wherein the values at coordinate (i, j) in the Gabor filter outputs of FIG. 19(*b*) are plotted over the horizontal axis of the pupil diameter-iris diameter ratio, the graph having been fitted with a D-dimensional polynomial expression.

FIG. 19(*c*) shows the Gabor filter output of a real part (or imaginary part) at a certain coordinate. In an actual case, this process is performed at all of the coordinates for obtaining feature data with respect to the real part and imaginary part and the analysis frequency of the Gabor filter. For example, where in a polar coordinate system, S points are provided in a radial direction, T points are provided in an angular direction, and Gabor filters of F frequency types are employed, Z polynomial expressions of degree D are generated.

$Z = S \times T \times F \times 2$

Multiplication by 2 corresponds to the real part and imaginary part.

As the value of degree D is set to a smaller value, the data amount of the iris database 12 decreases, but the accuracy of fitting deteriorates. As the value of degree D is conversely set to a larger value, the capacity of the iris database 12 increases, but the accuracy of fitting improves. In embodiment 2, the value of degree D is set to "3". If D=3, the relational expression is:

$Y = aX^3 + bX^2 + cX + d,$ where X denotes the pupil diameter-iris diameter ratio, Y denotes the Gabor filter output at a certain position in the polar coordinate system, and a, b, c and d denote coefficients.

The reason for selection of D=3 is as follows. In the case where iris authentication is used indoor, a variation in the pupil pattern can be approximated to a rubber sheet that uniformly expands and shrinks. The approximatability to a rubber sheet means that the sign (positive/negative) of the Gabor filter output does not change even if the pupil diameter-iris diameter ratio is changed. If the sign does not change, the bits of an iris code also do not change. That is, in a range near the pupil diameter-iris diameter ratio of a registered iris code, Y can be expressed by an expression of X of a relatively low degree (D=1 or 2). On the other hand, when the pupil is extremely contracted or expanded such that the pupil diameter-iris diameter ratio is far from that of a registered iris code, the bits of the registered iris code are inverted, and the sign of the Gabor filter output is changed. Although an expression of a higher degree is necessary for expressing such a relationship, a larger capacity is required for storing coefficients as the degree is increased. As such, D=3 is selected in embodiment 2. As a matter of course, in an application where improvement of the accuracy is prior to an increase in the storage capacity, the value of D may be set to a value greater than 3.

The coefficients of the relational expression calculated as described above are stored in the iris database 12 as parameters (SA7). FIG. 20 shows an example of data contents of the iris database 12 wherein coefficients a, b, c and d of the relational expression are stored. The first suffix of each coefficient corresponds to the feature data number, and the second suffix corresponds to the degree number.

Although a method wherein the relationship between the pupil diameter-iris diameter ratio and the Gabor filter output is expressed by polynomial fitting has been described herein, the relationship may instead be expressed using an orthogonal basis, such as a cosine transform, or the like.

Herein, the storage capacity for storing feature data is explained. In the method of Document 2, feature data is expressed in the form of binary information of a degree of 2048, and accordingly, the capacity of 2048 bits (=256 bytes) is required for a single piece of feature data. On the other hand, in embodiment 2 of the present invention, where each dimension is expressed by a cubic polynomial, and each coefficient is expressed by a single-precision floating point number (float; 4 bytes), the capacity for a single piece of feature data is:

2048×4×4=32768 (bytes).

That is, the required capacity is 128 times that required in Document 2.

For example, each parameter may be thinned before registration in order to reduce the capacity of the iris database. In a two-dimensional polar coordinate system, in the case where a 2-D Gabor filter is applied to an angular direction and a radial direction, an output value obtained after the convolution has a correlation at a spatially close position in an angular direction and a radial direction. Even in FIG. 10(*b*), the values are in series when locally observed, and accordingly, there is a correlation at a close position in an angular direction. Thus, the values of coefficients of the D-dimensional expression which are obtained from the Gabor filter output values are considered to have a correlation, and coefficients extracted with intervals of several points are registered for both an angular direction and a radial direction. Where coefficients are registered at every other point for both an angular direction and a radial direction, the increase of 128 times in the above example is reduced to an increase of 32 times (128/2/2=32). At the time of authentication, interpolation is performed using neighboring coefficient values to calculate omitted coefficient values.

FIG. 21 is a flowchart showing the process performed at the time of authentication according to embodiment 2. The process performed at the time of authentication (authentication process) in a personal authentication method of embodiment 2 is described in accordance with the flow of FIG. 21.

The processes at steps SB1 to SB3 are the same as those of embodiment 1. In the first place, a person to be authenticated captures iris images using the iris image acquisition section 41 of the iris authentication device 15A (SB1). Then, the feature extraction section 42 extracts an iris code as feature data from the captured iris image (SB2), and the ratio calculation section 43 calculates the pupil diameter-iris diameter ratio as the pupil opening degree index from the captured iris image (SB3).

Then, the feature data calculation section 46 obtains a relational expression from the parameters registered in the iris database 12 and assigns the pupil diameter-iris diameter ratio calculated by the ratio calculation section 43 to the relational expression, thereby calculating iris data to be collated (SB6). For example, in the case where the pupil diameter-iris diameter ratio extracted from an iris image obtained at the time of authentication is 0.41, the pupil diameter-iris diameter ratio of 0.41 is assigned to a D-dimensional expression generated from the parameters stored in the iris database of FIG. 20, whereby an output value is calculated. Then, the output value is binarized. This process is performed for every dimension to generate a binary iris code.

In the case of 1:N authentication, an iris code is obtained for each of all the registrants registered in the iris database 12. On the other hand, in the case of 1:1 authentication wherein an ID of his/her own is declared, one iris code is acquired for a registrant corresponding to the declared ID by assigning the pupil diameter-iris diameter ratio to a D-dimensional expression generated from the registered parameters.

Then, the authentication section 45 performs authentication by comparing the iris code extracted by the feature extraction section 42 and the iris code acquired by the feature data calculation section 46 (SB7). The process at this step is the same as that performed at step SB5 of embodiment 1, and therefore, descriptions thereof are herein omitted.

As described above, according to embodiment 2, at the time of registration, a plurality of iris images having different pupil opening degrees are obtained from a registrant, and parameters of a D-dimensional expression for generating feature data are calculated from the plurality of iris images and registered. At the time of authentication, a pupil diameter-iris diameter ratio obtained at the time of authentication is assigned to a D-dimensional expression calculated from the registered parameters to determine an iris code to be collated. Since an iris code determined according to the pupil opening degree of an iris image captured at the time of authentication is generated as an item to be collated, personal authentication is performed with a suppressed false rejection rate irrespective of whether the pupil is in a contracted state or extracted state at the time of authentication.

In Document 3, the difference between the pupil diameter measured at the time of registration and the pupil diameter measured at the time of authentication is absorbed (removed) by preparing a plurality of registered images having different pupil diameters instead of using a polar coordinate representation as shown in Document 2. Thus, a large number of iris images or feature data having slightly-different pupil diameters are required in order to improve the authentication accuracy, and this causes an increase in the capacity of a database. This is because even if the difference in the pupil diameters is slight, different feature data are obtained. Further, it is necessary to perform collation with a large number of iris images at the time of authentication, and therefore, the authentication time greatly increases. This problem is more acute in the case of 1:N authentication because it is necessary to register a large amount of feature data for a large number of registrants and collate all of these feature data at the time of authentication.

On the other hand, in the above-described embodiments of the present invention, a plurality of iris codes are registered in conjunction with the pupil diameter-iris diameter ratios, and the pupil diameter-iris diameter ratios are compared at the time of authentication to select an iris code to be collated. Alternatively, parameters of a D-dimensional expression for generating feature data are registered, and at the time of authentication, the pupil diameter-iris diameter ratio obtained at the time of authentication is assigned to a D-dimensional expression which is calculated from the registered parameters to determine an iris code to be collated. Thus, none of the capacity of the iris database and the authentication time is increased. Therefore, the embodiments of the present invention are significantly improved in practicability as compared with the subject matter of Document 3.

It should be noted that, in the case of authentication performed outdoor, not only a variation in the iris pattern but also reflection of external light constitutes an authentication inhibition factor. However, this problem of reflection has been solved by the inventors of the present application as described in Japanese Patent Application No. 2002-28446.

Embodiment 3

In embodiment 3 of the present invention, at the time of registration, an iris code with the pupil diameter-iris diameter ratio attached thereto is registered in an iris database together with a transformation rule for transforming this registered iris code to another iris code having a different pupil diameter-iris diameter ratio. At the time of authentication, the obtained pupil diameter-iris diameter ratio is used to generate an iris code to be collated based on the iris code and transformation rule registered in the iris database.

Figure 26:
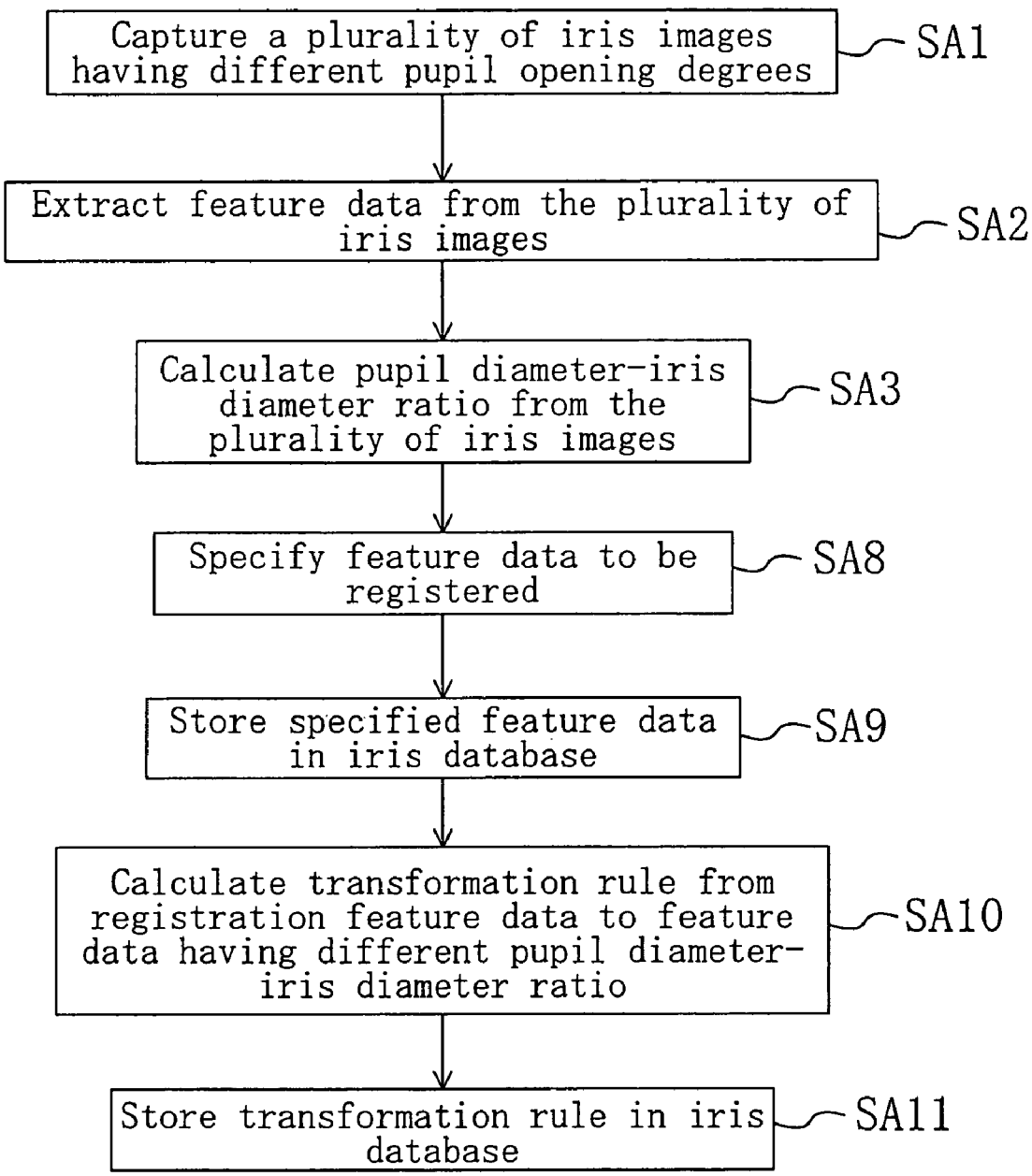
FIG. 26 is a flowchart illustrating the process performed at the time of registration according to embodiment 3 of the present invention.

FIG. 26 is a flowchart showing the process performed at the time of registration according to embodiment 3. The process performed at the time of registration (registration process) in a personal authentication method of embodiment 3 is described in accordance with the flow of FIG. 26.

In the first place, a registrant captures a plurality of iris images having different pupil opening degrees (SA1). Then, feature data are extracted from the plurality of iris images captured at step SA1 (SA2), and the pupil diameter-iris diameter ratios are calculated from the plurality of captured iris images (SA3). These processes are the same as those of embodiment 1, and therefore, detailed descriptions thereof are herein omitted.

Then, at least one piece of feature data to be registered in the iris database is specified (SA8). The specified feature data is stored in the iris database (SA9). Herein, it is assumed that feature data having the most typical pupil diameter-iris diameter ratio is selected as registration feature data. This is because the possibility of inputting an iris image which has a typical pupil diameter-iris diameter ratio at the time of authentication is estimated to be highest. For example, the maximum value and minimum value are selected from the pupil diameter-iris diameter ratios of the plurality of acquired iris images, and feature data having a pupil diameter-iris diameter ratio closest to the middle of these values ((maximum value+minimum value)/2) is selected. In the case where the pupil diameter-iris diameter ratio of registration iris data and the pupil diameter-iris diameter ratio obtained at the time of authentication are close to each other, authentication with a reduced false rejection rate is realized without transforming registration iris data.

Alternatively, feature data having a pupil diameter-iris diameter ratio of an iris image captured in an environment where a registrant performs an authentication operation most frequently may be selected as registration feature data. For example, for a person who frequently performs authentication indoor, feature data having a pupil diameter-iris diameter ratio obtained in an indoor-brightness environment is selected. For a person who frequently performs authentication outdoor, feature data having a pupil diameter-iris diameter ratio obtained in an outdoor-brightness environment is selected.

Then, a transformation rule for transforming registration feature data stored at step SA9 to feature data having a different pupil diameter-iris diameter ratio is calculated (SA10). Strictly explaining, when the pupil diameter is changed, the iris pattern exhibits a nonuniform deformation in a perimeter direction. On the other hand, as seen from FIG. 23, a variation in the hamming distance is small even if a small variation occurs in the pupil diameter. Thus, authentication is successfully realized when the difference between the pupil diameter-iris diameter ratio obtained at the time of registration and the pupil diameter-iris diameter ratio obtained at the time of authentication is small. Herein, a transformation rule for feature data which is employed for a case where the difference in the pupil diameter-iris diameter ratio is large to some extent is calculated.

Herein, it is assumed that the pupil diameter-iris diameter ratio of registration feature data is R0, and the pupil diameter-iris diameter ratio of feature data for which a transformation rule is calculated is R1. As shown in FIG. 27, a portion where a bit group which is part of iris code with pupil diameter-iris diameter ratio R0 corresponds to a bit group which is part of iris code with pupil diameter-iris diameter ratio R1 is obtained, and a transformation rule is expressed by the shift amount (bit shift amount) between the bit groups. This bit shift amount basically increases as the difference in the pupil diameter-iris diameter ratio between the two codes increases. In the example of FIG. 27, the transformation rule is expressed as "the 6th to 10th bits are shifted by 3 bits" and "the 19th to 25th bits are shifted by −3 bits".

The calculated transformation rule is stored in the iris database (SA11). For example, the transformation rule is stored in the form of a table as shown in FIG. 28. Although in the example described herein the transformation rule is stored in the iris database, the transformation rule may be stored in an authentication device in the case where a person to be authenticated always uses an identical terminal, for example, the portable authentication device of FIG. 5. In this case, only a table corresponding to an eye of a person to be authenticated is stored in the authentication device.

Figure 29:
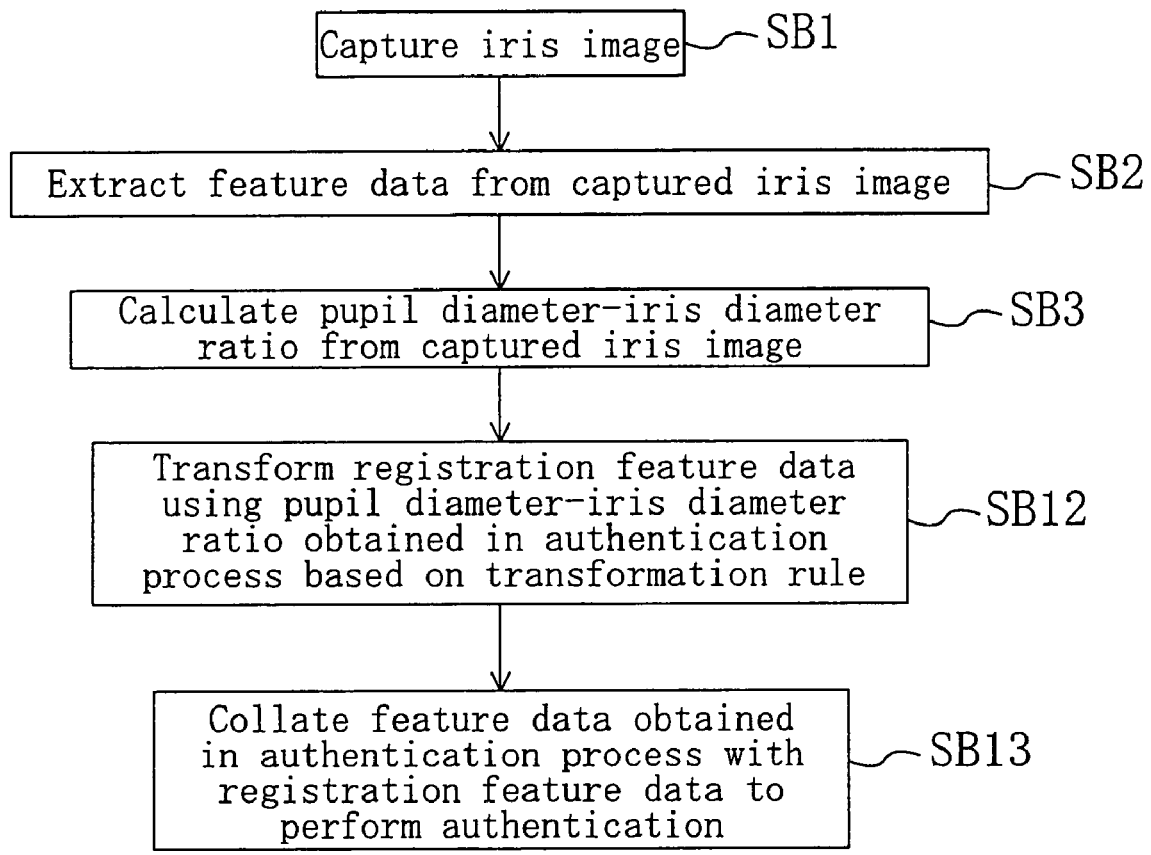
FIG. 29 is a flowchart illustrating the process performed at the time of authentication according to embodiment 3 of the present invention.

FIG. 29 is a flowchart showing the process performed at the time of authentication according to embodiment 3. The process performed at the time of authentication (authentication process) in a personal authentication method of embodiment 3 is described in accordance with the flow of FIG. 29.

The processes of steps SB1 to SB3 are the same as those of embodiment 1, and therefore, descriptions thereof are herein omitted.

Then, registration feature data is transformed using the pupil diameter-iris diameter ratio obtained at the time of authentication based on a transformation rule (SB12). In the case where feature data of a plurality of persons (eyes) are registered in the iris database, a transformation rule is also stored for each person (eye).

In the case of 1:N authentication, each registration iris code is transformed using the pupil diameter-iris diameter ratio of an iris image acquired at the time of authentication based on a transformation rule corresponding to a registrant considered. In the case of 1:1 authentication, a registration iris code corresponding to a person to be authenticated is transformed using the pupil diameter-iris diameter ratio of an iris image acquired at the time of authentication based on a transformation rule corresponding to a person to be authenticated. In the case where the transformation rules are stored in the authentication device and 1:N authentication is performed, all of the registration iris codes may be transformed using a transformation rule of a person to be authenticated which is stored in the authentication device.

Then, authentication is performed by comparing feature data (item to be collated) which has been obtained by transforming registration feature data with feature data obtained at the time of authentication (SB13).

As described above, according to embodiments, at the time of registration, an iris code is registered together with a transformation rule for achieving transformation to another iris code having a different pupil diameter-iris diameter ratio. At the time of authentication, a registration iris code is transformed using the pupil diameter-iris diameter ratio of an iris image acquired at the time of authentication based on the transformation rule, whereby an item to be collated is generated. As a result, authentication is realized while an increase in the false rejection rate is suppressed.

It should be noted that although an iris code is used as feature data of an iris image in the above-described embodiments of the present invention, any other feature data may be used. Although a polar coordinate system representation is used for generation of feature data, it is not necessary to use this representation.

It should be noted that although the processes described in the above embodiments can be entirely or partially implemented by using a computer to execute a program. For example, an iris authentication device includes a computer and a memory which serves as a recording medium for storing an iris authentication program. The iris authentication program is only required to instruct the computer to execute the process performed at the time of authentication (authentication process) which has been described in the above embodiments.

Industrial Applicability

The present invention enables personal authentication with sufficiently high accuracy and suppressed false rejection rate under various environments and is therefore useful in the case where an iris authentication function is incorporated in a cellular mobile phone, a PDA, or the like, and mobile authentication for electronic commerce applications is performed.

The invention claimed is:

1. A personal authentication method using iris images, comprising a registration process and an authentication process, the registration process includes including the steps of:
capturing, by a capture device, a plurality of iris images having different pupil opening degrees from a registrant;
obtaining feature data and a ratio of pupil diameter to iris diameter from each of the plurality of iris images and associating the obtained ratio of pupil diameter to iris diameter with the corresponding obtained feature data;
obtaining a polynomial expression defining the feature data as a function of the obtained ratio of pupil diameter to iris diameter based on a plurality of pieces of feature data and ratios of pupil diameter to iris diameter obtained from the plurality of captured iris images, wherein a degree of the polynomial expression is greater than or equal to 2; and
registering parameters for expressing the polynomial expression in an iris database in conjunction with the registrant, and the authentication process including the steps of:
capturing, by a capture device, an iris image from a person to be authenticated;
obtaining feature data and a ratio of pupil diameter to iris diameter of the person to be authenticated from the acquired iris image;
obtaining the polynomial expression from the parameters registered in the iris database corresponding to the registrant and applying the ratio of pupil diameter to iris diameter obtained in the authentication process to the polynomial expression of the registrant to obtain feature data to be collated;
comparing the feature data to be collated with the feature data obtained from the person to be authenticated in the authentication process to determine whether or not the person to be authenticated is the registrant; and
outputting the comparing result through an output device.

2. The personal authentication method of claim 1, wherein:
the registration process includes the step of reducing the number of the parameters before registration; and
the authentication process includes the step of restoring the reduced number of parameters by interpolation.

3. A personal authentication method using iris images, comprising:
a first step of capturing, by a capture device, an iris image from a person to be authenticated;
a second step of obtaining feature data and a ratio of pupil diameter to iris diameter, of the person to be authenticated, from the iris image obtained at the first step;
a third step of obtaining a polynomial expression from parameters registered in an iris database in conjunction with a registrant, the iris database storing parameters which express the polynomial expression as defining feature data of the registrant as a function of a ratio of pupil diameter to iris diameter of the registrant, wherein a degree of the polynomial expression is greater than or equal to 2; and
a fourth step of applying the ratio of pupil diameter to iris diameter obtained at the second step to the polynomial expression thereby obtaining feature data to be collated;
a fifth step of comparing the feature data to be collated which is obtained at the third step with the feature data obtained at the second step to determine whether or not the person to be authenticated is the registrant; and
a sixth step of outputting the comparing result through an output device.

4. An iris registration device which performs data registration for iris authentication, comprising:
means for acquiring a plurality of iris images having different pupil opening degrees from a registrant;
means for obtaining feature data and a ratio of pupil diameter to iris diameter from each of the plurality of iris images and associating the obtained ratio of pupil diameter to iris diameter with the corresponding obtained feature data;
means for obtaining a polynomial expression defining the obtained feature data as a function of the obtained ratio of pupil diameter to iris diameter based on a plurality of pieces of feature data and ratios of pupil diameter to iris diameter obtained from the plurality of acquired iris images, wherein a degree of the polynomial expression is greater than or equal to 2; and
means for registering parameters for expressing the polynomial expression in an iris database in conjunction with the registrant.

5. An iris authentication device which performs personal authentication using iris images, comprising:
means for acquiring an iris image from a person to be authenticated;
means for obtaining feature data and a ratio of pupil diameter to iris diameter, of the person to be authenticated, from the acquired iris image;

means for obtaining a polynomial expression defining feature data of a registrant as a function of a ratio of pupil diameter to iris diameter of the registrant from parameters registered in an iris database corresponding to the registrant and applying the obtained ratio of pupil diameter to iris diameter to the polynomial expression to obtain feature data to be collated, wherein a degree of the polynomial expression is greater than or equal to 2; and means for comparing the feature data to be collated with the feature data obtained from the person to be authenticated to determine whether or not the person to be authenticated is the registrant.

6. A memory encoded with a program for instructing a computer to execute personal authentication using iris images, comprising the steps of:

obtaining feature data and a ratio of pupil diameter to iris diameter, of a person to be authenticated, from an iris image acquired from the person to be authenticated;

obtaining a polynomial expression defining feature data of a registrant as a function of a ratio of pupil diameter to iris diameter of the registrant from parameters registered in an iris database corresponding to the registrant and applying the obtained ratio of pupil diameter to iris diameter to the polynomial expression to obtain feature data to be collated, wherein a degree of the polynomial expression is greater than or equal to 2; and comparing the feature data to be collated with the feature data obtained from the person to be authenticated to determine whether or not the person to be authenticated is the registrant.

7. The method of claim 1 wherein the obtained feature data is an output of a Gabor filter, such that the polynomial expression defines the output of the Gabor filter as a function of the ratio of pupil diameter to iris diameter.

* * * * *